(12) United States Patent
Malik

(10) Patent No.: US 7,904,558 B2
(45) Date of Patent: *Mar. 8, 2011

(54) GUEST ACCOUNT LIFE CYCLE

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/397,079

(22) Filed: Mar. 3, 2009

(65) Prior Publication Data

US 2009/0164235 A1 Jun. 25, 2009

Related U.S. Application Data

(63) Continuation of application No. 10/820,374, filed on Apr. 8, 2004, now Pat. No. 7,519,708.

(51) Int. Cl.
G06F 15/16 (2006.01)
G06F 12/00 (2006.01)

(52) U.S. Cl. .................................. 709/225; 709/206

(58) Field of Classification Search .......... 709/223–229, 709/220, 221, 250
See application file for complete search history.

(56) References Cited

U.S. PATENT DOCUMENTS

| | | | |
|---|---|---|---|
| 5,780,133 A | 7/1998 | Engstrom | |
| 5,794,207 A | 8/1998 | Walker et al. | |
| 6,186,893 B1 | 2/2001 | Walker et al. | |
| 6,321,337 B1 | 11/2001 | Reshef et al. | |
| 6,594,819 B1 | 7/2003 | Ciarlante et al. | |
| 6,721,784 B1 | 4/2004 | Leonard et al. | |
| 6,795,811 B1 | 9/2004 | Epstein | |
| 6,965,868 B1 | 11/2005 | Bednarek | |
| 7,031,945 B1 | 4/2006 | Donner | |
| 7,130,815 B1 | 10/2006 | Gupta | |
| 7,149,893 B1 | 12/2006 | Leonard et al. | |
| 7,308,413 B1 | 12/2007 | Tota et al. | |
| 7,519,708 B2 * | 4/2009 | Malik | ......... 709/225 |
| 2002/0021307 A1 | 2/2002 | Glenn et al. | |
| 2002/0046094 A1 | 4/2002 | Takekuma | |
| 2002/0052778 A1 | 5/2002 | Murphy et al. | |
| 2002/0059144 A1 | 5/2002 | Meffert et al. | |
| 2002/0161641 A1 | 10/2002 | Quinlan et al. | |
| 2002/0196937 A1 | 12/2002 | Probst | |
| 2003/0040962 A1 | 2/2003 | Lewis | |
| 2003/0050976 A1 | 3/2003 | Block et al. | |
| 2003/0105666 A1 | 6/2003 | Taub et al. | |
| 2003/0140103 A1 | 7/2003 | Szeto et al. | |
| 2004/0039633 A1 | 2/2004 | Nicholson | |

(Continued)

OTHER PUBLICATIONS

Malik; Non-Final Rejection mailed Feb. 3, 2010 for U.S. Appl. No. 10/977,804, filed Oct. 29, 2004.

(Continued)

*Primary Examiner* — Zarni Maung
(74) *Attorney, Agent, or Firm* — Thomas, Kayden, Horstemeyer & Risley, LLP

(57) ABSTRACT

The present disclosure provides systems and methods for managing accounts within a network community. Briefly described in architecture, some embodiments of such a system provide an account server to manage direct accounts for resident users of the network community and guest accounts for guests of the resident users. In addition, a client of a respective resident user of the network community is configured to send to a non-resident user of the network community an invitation to become a guest of the respective resident user. Other systems and methods are also provided.

20 Claims, 17 Drawing Sheets

U.S. PATENT DOCUMENTS

| | | | |
|---|---|---|---|
| 2004/0102992 | A1 | 5/2004 | Tapsell et al. |
| 2004/0103203 | A1 | 5/2004 | Nichols et al. |
| 2004/0116115 | A1 | 6/2004 | Ertel |
| 2004/0133440 | A1 | 7/2004 | Carolan et al. |
| 2004/0193867 | A1 | 9/2004 | Zimmer et al. |
| 2005/0033615 | A1* | 2/2005 | Nguyen et al. .................... 705/5 |
| 2005/0041647 | A1 | 2/2005 | Stinnie |
| 2005/0080733 | A1 | 4/2005 | McIntosh |
| 2005/0091385 | A1 | 4/2005 | Nordstrom |
| 2005/0149437 | A1 | 7/2005 | Zellner et al. |
| 2005/0216842 | A1 | 9/2005 | Keohane et al. |
| 2005/0228680 | A1 | 10/2005 | Malik |
| 2005/0228723 | A1* | 10/2005 | Malik ............................. 705/26 |
| 2006/0019702 | A1 | 1/2006 | Anttila et al. |
| 2008/0077483 | A1 | 3/2008 | Hollo et al. |

OTHER PUBLICATIONS

Malik; Examiner Interview Summary mailed Feb. 28, 2008 for U.S. Appl. No. 10/820,422, filed Apr. 8, 2004.

Malik; Final Rejection mailed May 2, 2008 for U.S. Appl. No. 10/820,422, filed Apr. 8, 2004.

Malik; Final Rejection mailed Nov. 17, 2008 for U.S. Appl. No. 10/820,422, filed Apr. 8, 2004.

Malik; Non-Final Rejection mailed Nov. 23, 2007 for U.S. Appl. No. 10/820,422, filed Apr. 8, 2004.

Malik; U.S. Appl. No. 10/820,422, filed Apr. 8, 2004.

Malik Non-Final Rejection mailed Dec. 27, 2007 for U.S. Appl. No. 10/820,374, filed Apr. 8, 2004.

Malik, Notice of Allowance and Fees due mailed Dec. 3, 2008 for U.S. Appl. No. 10/820,374, filed Apr. 8, 2004.

Malik; Examiner Interview Summary mailed Mar. 28, 2008 for U.S. Appl. No. 10/820,374, filed Apr. 8, 2004.

Malik; Final Rejection mailed Jun. 25, 2008 for U.S. Appl. No. 10/820,374, filed Apr. 8, 2004.

Malik; U.S. Appl. No. 10/820,374, filed Apr. 8, 2004.

Malik, Non Final Rejection mailed Feb. 3, 2009 for U.S. Appl. No. 10/977,804, filed Oct. 29, 2004.

Malik; Non-Final Rejection mailed Jul. 2, 2008 for U.S. Appl. No. 10/977,804, filed Oct. 29, 2004.

Malik; U.S. Appl. No. 10/977,804, filed Oct. 29, 2004.

Malik; Non-Final Rejection mailed Apr. 15, 2009 for U.S. Appl. No. 10/820,422, filed Apr. 8, 2004.

Malik; Interview Summary mailed Apr. 30, 2009 for U.S. Appl. No. 10/977,804, filed Oct. 29, 2004.

Malik; Final Office Action mailed Aug. 17, 2009 for U.S. Appl. No. 10/977,804, filed Oct. 29, 2004.

Malik; Interview Summary mailed Nov. 5, 2009 for U.S. Appl. No. 10/977,804, filed Oct. 29, 2004.

Malik; Final Office Action mailed Dec. 8, 2009 for U.S. Appl. No. 10/820,422, filed Apr. 8, 2004.

Malik; Final Office Action mailed Oct. 13, 2010 for U.S. Appl. No. 10/977,804, filed Oct. 29, 2004.

* cited by examiner

GUEST ACCOUNT LIFE CYCLE

CROSS-REFERENCE TO RELATED APPLICATION

This application is a continuation of copending U.S. utility application having Ser. No. 10/820,374, filed Apr. 8, 2004, which is entirely incorporated herein by reference.

TECHNICAL FIELD

The present disclosure is generally related to networking and, more particularly, is related to networking accounts.

BACKGROUND

Network communications, such as through the Internet, have changed the way people communicate. For example, Internet communications, such as e-mail, instant messaging, web-based chat, etc, have become the primary modes of communication in many settings, being preferred over traditional mail, and even conventional telephones in some cases. Via these emerging modes of communications, a variety of products and services are offered to users. However, among other difficulties, providers of such products and services have a difficult time attracting users while also providing quality service and support.

Thus, a heretofore unaddressed need exists in the industry to address the aforementioned deficiencies and inadequacies.

SUMMARY

The present disclosure provides systems and methods for managing accounts within a network community. Briefly described in architecture, some embodiments of such a system provide an account server to manage direct accounts for resident users of the network community and guest accounts for guests of the resident users. In addition, a client of a respective resident user of the network community is configured to send to a non-resident user of the network community an invitation to become a guest of the respective resident user.

Some embodiments, among others, of a method for managing accounts within a network community comprise the steps of: sending an invitation to a non-resident user of the network community to become a guest of a resident user of the network community; and managing a direct account of the resident user and a guest account of a guest of the resident user.

Other features and/or advantages will be or may become apparent to one with skill in the art upon examination of the following drawings and detailed description. It is intended that all such additional features and/or advantages be included within the description.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
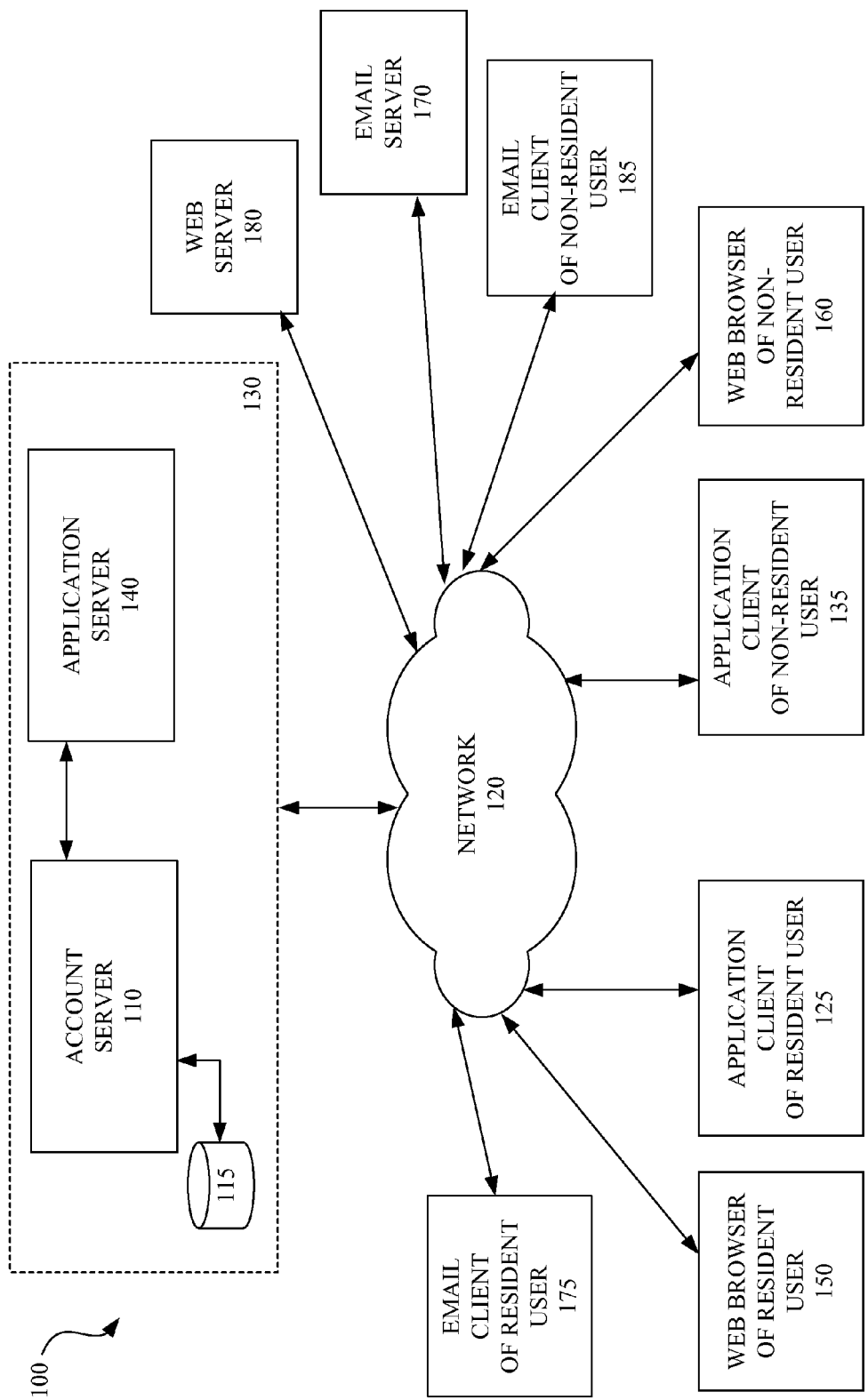
FIG. 1 is a block diagram showing one embodiment of component architecture of a system for facilitating a network community.

Reference is now made in detail to the description of embodiments as illustrated in the drawings. While several embodiments are described in connection with these drawings, there is no intent to limit to the embodiment or embodiments disclosed herein. On the contrary, the intent is to cover all alternatives, modifications, and equivalents. All "examples" given herein are intended to be non-limiting.

FIG. 1 is a block diagram showing one embodiment of component architecture of a system for facilitating a network community (e.g., an association of Internet users). As shown in FIG. 1, one embodiment of the system 100 for facilitating a network community comprises an account server 110. The account server 110 manages tasks and services associated with a network service environment 130 (e.g., a network or system for facilitating an Internet community). Typically, a network service environment 130 provides a service, product, or application (such as an email messaging service, digital video disc (DVD) rental service, travel reservation service, instant messaging application, virus protection service, etc.) about which a community of registered users is developed. For example, America Online (AOL®) Instant Messenger® is an instant messaging product associated with a community of registered AOL® Instant Messenger users. As another example, NetFlix® is the brand name of a DVD rental service that has a community of users who utilize the World Wide Web to rent movies transferred through the United States mail system.

Accordingly, the network service environment 130 is typically identified with a particular communication application/product or service, such as an instant messaging service, a message board, file transfer programs, an email program, media players, DVD rental service, communications clients, among others, etc. Therefore, in some embodiments, direct members (e.g., resident users, paid customers, subscribers, registered users, etc.) of the network service environment 130 can communicate with each other via the particular communication application or service (e.g., instant messaging, etc.) and associated application client 125 (e.g., instant messaging client, e-mail client, web browser, etc.). In such embodiments, direct members (e.g., resident users) can access an application server 140 that manages the transfer of communication messages between users. In other embodiments, direct members of the network service environment 130 can communicate with the application server 140 to access shared resources for the network service environment and/or download products from the network service environment 130.

Typically, a user has a direct member account for each network service environment 130 that the user is a direct member or resident user. Accordingly, each direct member account contains information that is pertinent to the respective network service environment 130. For example, "John" may have a direct member account to an email messaging service. John's email account, therefore, contains his username, password, email server settings, etc. Also, as part of John's email service, he may also be entitled to more than one mailbox that John can allow another person (e.g., a child) to use. However, John maintains administrative control over the mailbox and is also typically responsible for its use under his user policy with the email messaging service provider. Such a main account with a primary user who maintains administrative control over other users associated with the main account is typically called a family account. Accordingly, if John allows "Sue" to use one of his mailboxes to send and receive mail and Sue abuses the use of the mailbox (e.g., sends spam), then John is responsible for Sue's actions and is subject to potential cancellation of his email account by the email messaging service provider. Therefore, John, with his administrative control, can then configure Sue's mailbox to prevent her from sending any mail, or even delete Sue's mailbox.

Diversely, if John has a direct member account to an email service environment (a type of network service environment 130) and makes "Beth" his guest (e.g, an indirect member), then John ("a host of Sue's guest account") is not directly responsible for Beth's actions in the email service environment (under the rules of the email service environment). Accordingly, in some embodiments, a guest or indirect member affirmatively verifies to obey the rules of the network service environment 130 (e.g., by "clicking" on an "I Accept" button after reading the rules of the particular network service environment 130). Note, this is distinct from being listed as a "child" under a family account where the user of the child mailbox does not have administrative control over the mailbox itself. Correspondingly as a host, John is not able to administratively control Beth's use of a mailbox that has been assigned to her as a guest of John. Therefore, a direct member typically does not have administrative authority to configure preferences and settings of guest accounts that are sponsored by the direct member, and the direct member is not directly responsible for the actions of the indirect member ("guest") within the network service environment 130. Typically, a direct member of a network service environment 130 exists as a customer of the ISP of the network service environment 130. However, a guest does not exist as a customer of the ISP; he or she exists as a guest of the direct member. As explained later, a guest can also choose to convert his or her guest membership into a direct membership. In fact, in some embodiments, a guest is offered to become a direct member after the host of the guest has chosen to terminate the guest's guest account. In contrast, a user of a child account is not typically afforded such an opportunity when a family account is terminated. Another distinctions between a child account and a guest account, for some embodiments, is that a user of a child account may be able to offer services (e.g., mailbox, access time, etc.) of the parent account to other users while a user of a guest account is not able to offer services of the host account to other users.

By sponsoring other persons to participate in the network service environment 130 as guests, a direct member creates an association or community of participants that are joined together by their association with the direct member. In this way, the direct member fosters an association of participants within the network service environment 130. From the perspective of the provider of the network service environment 130, associations created by direct members are easily identifiable, since direct member accounts within the account database 115 identify guests of the direct member, and guest accounts identify the sponsoring direct member or host of the guest. Therefore, the provider of the network service environment 130 can target offers of additional services and products to the association as a whole or to a particular participant due to his or her participation in the association or community. Accordingly, different rules may apply to services under a direct member account than for services under a guest account. For example, payment options for a particular task performed by the application server 140 may be based upon specified rules, such as whether the user is a guest, a premium guest, or whether the host of the guest is a premium direct member, basic direct member, etc.

By capturing or determining an association of customers or potential customers, a provider of a service/product has gained an important tool to aid the provider in enhancing services and products offered to users of the association. Further, by fostering the establishment of relationships among users in the association, a respective user is less likely to break the ties of these relationships by discontinuing direct membership in the network service environment 130. For example, in some embodiments, the cancellation of a direct membership causes the cancellation of the guests accounts associated with the direct member account. In addition, a guest user may be likely to convert his or her guest account into a direct member account after the user has started and formed relationships with other users of the network service environment 130.

Typically, a direct member has a registered account for the network service environment 130 in the account database 115. Each indirect member or guest of the network service environment 130 also has an account (or profile) maintained in the account database 115 that is associated or linked to an account of a direct member or resident user that sponsors the guest.

The forms of the direct member account and the indirect member account are similar so that an indirect member account can be easily converted to a direct member account, if desired. Information typically provided by a direct member and included in the direct member account for the network service environment 130 includes a distinct username and password so that the user can verify himself or herself as a direct member. Correspondingly, a user of a guest account also provides a distinct username and password that is included in the user's guest account to verify the user as a registered guest of the network service environment 130.

After a user's guest account has been created, the account server 110 is capable of verifying that a user is a guest (of a direct member) by requesting information (such as a username and password) from the user that matches information contained within a guest account in the account database 115. Additional information is also included in the member accounts, such as application settings and user preferences. Note, the user may have more than one member account for different network service environments. In some embodiments, however, member accounts for different network service environments 130 may be maintained in a consolidated account database 115 or in separate databases for each network service environment 130. Also, in some embodiments, a user who is a member of more than one network service environment 130 may have a single member account utilized by more than one network service environment 130.

To initiate a direct membership or registration with a network service environment 130, a user, typically, creates an account in the account database 115 for the network service environment 130. Typically, a user may create and setup a direct member account via a web browser 150. However, other devices, such as a telephone, an operator, interactive voice response system, etc. may be utilized to create and set-up the account.

Preferably, as a direct member of a network service environment 130, a respective direct member (resident user) may sponsor a non-resident user (who is not a direct member of the network service environment 130) as a guest of the direct member of the network service environment 130 so that the guest can gain access to services and/or products provided by the network service environment 130. A guest of a particular direct member of the network service environment 130 is then able to benefit from some of the services and features that have been granted to the particular direct member or "host" of the guest. In some embodiments, the services and features available to a guest of a direct member are not available to new direct members of the network service environment. For example, a direct member who has paid for a certain level of service (e.g. "a premium direct member") receives features and services that are not available to a direct member at a lower level (e.g., a "basic direct member"). Therefore, a guest of a premium direct member may also be able to enjoy features and services that are not available to a basic direct member or a guest of a basic direct member.

In some embodiments, both direct members and guests may interactively participate in the network service environment 130 with other guests and direct members of the network service environment 130 (e.g., instant messaging network) or may participate in use of a particular service/product (e.g., a DVD rental service). Accordingly, guests may interact and participate via an application client 135 for the network service environment. As such, an application client 125 of a member of the network service environment 130 enables a user to interface and communicate with the application server 140. For example, in some embodiments, the application client 125, 135 of direct members and guests of the network service environment 130 communicate with an application server 140 (e.g., email server, instant messaging server, web server, file server, etc.) that manages requests for a particular application/product or service from the application clients 125, 135. Further, in some embodiments, a direct member can facilitate for each of his or her guest users to identify and communicate amongst each other. For example, as explained below, in some embodiments, a direct member can enable his or her contact list (that contains contact information for each of his or her guests) to provided to each of the respective guests.

Consider that an application client 125 of an instant messaging environment may be an instant messaging user interface, whereas an application client 125 for a web-based DVD rental service may be a web browser with a web page loaded from a web site of the web-based DVD rental service. Further, in some embodiments, users of one network service environment 130 are capable of communicating with users of other network service environments (not shown) that offer similar services under different technological protocols (e.g., disparate instant messaging networks). In other embodiments, the network service environment 130 operates under a closed environment with a proprietary protocol. Accordingly, the application client 125 for different embodiments may embody different forms and perform diverse functions.

In some embodiments, direct membership to the network service environment 130 is complimentary. In others, direct membership is for a fee or part of a bundle of services provided by an Internet service provider (ISP), for example, that maintains the network service environment 130. Accordingly, in other embodiments, direct membership to a network service environment 130 may also be contingent upon having a main account for the ISP. For example, in order to register for a particular instant messaging service, a user may also have to first establish another account with the provider of the instant messaging service.

One feature of direct membership of the network service environment 130 is an allotted number of guest accounts ("guest slots") that can be created under a direct member account for that network service environment 130. In some embodiments, the number of allotted guest slots varies according to the type of direct membership. For example, a premium direct member may be allotted more guest slots than a basic direct member. Further, a direct member account for an instant messaging product may have more guest slots that are available than a direct member account for some other type of product (e.g., email messaging product, file-transfer program, etc.). Therefore, the number of guest slots, in some embodiments, vary by product-type as well as by an account type or class.

A direct member can invite another person to become a guest of that direct member and to have access to services of the network service environment 130. A person that receives an invitation (via an email message, for example) to be a guest of a direct member may accept the invitation by following instructions contained within the invitation. The instructions typically explain how the person can initiate the creation of a guest account in the account database 115 (e.g., by instructing the person to click on a hyperlink contained in the email message, among others) (as discussed hereinafter). A direct member can also send out more guest invitations than the direct member has allotted guest slots. However, the number of guest accounts that can be granted by the direct member is limited to the number of guest slots allotted to the direct member.

Figure 2:
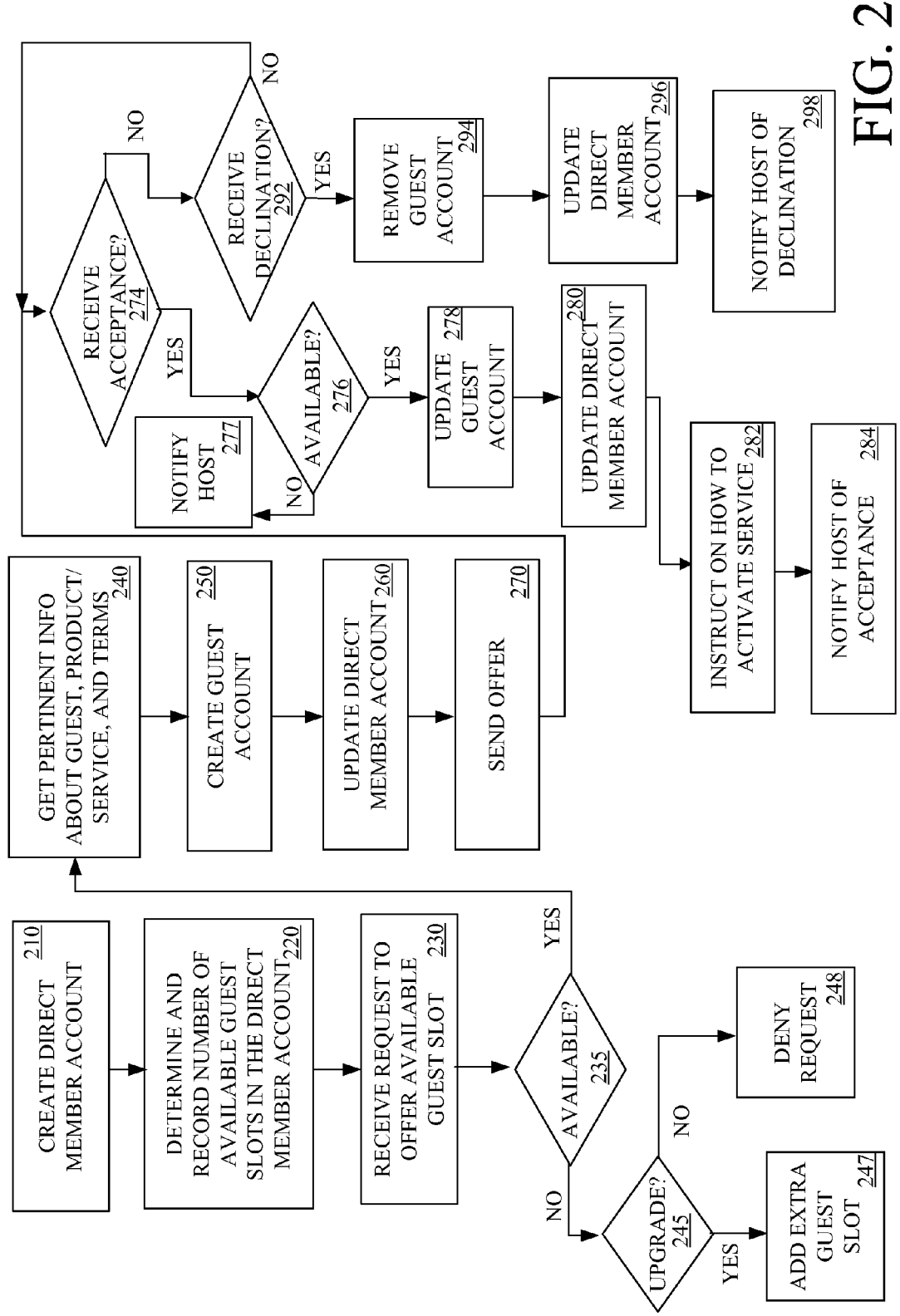
FIG. 2 is a flowchart describing the functionality of a representative embodiment of the system in FIG. 1.

As depicted in FIG. 2, the functionality of a representative embodiment of the system 100 for facilitating a network community or method 200 may be construed as beginning at block 210. First, a direct member account is created (210) for a user of a product/service provided in a network service environment 130. Typically, the user completes a registration procedure to setup the direct member account. In this registration procedure, the user provides pertinent information for enabling the supplying of a service or product to the user. The registration procedure may be completed in a variety of manners, including filling out a form on a web page, responding to an interactive voice response system, talking to a live operator, filling out a paper form, etc.

The number of guest slots that are available by the user to be filled with guest users may be determined (220) based upon a class of service associated with the direct member account and then, the determined number of guest slots is recorded in the direct member account. For example, a user of a premium direct member account may be provided more guest slots than a user of a basic direct member account. Accordingly, a class of service marker is denoted in the direct member account to indicate the class of membership (e.g., premium, basic, etc.). Further, in some embodiments, the number of guest slots, in some embodiments, vary by product-type as well as by an account type or class. For example, a premium direct member account to a network service environment 130 that provides instant messaging product(s) may have more guest slots than a premium direct member account to a network service environment 130 that provides file transfer product(s).

In another step, a request is received (230) by the resident user of the direct member account to offer an available guest slot to another person (a non-resident user). Typically to generate the request from the resident user, the resident user launches the application client 140 and utilizes a mechanism within the application client 140 for generating the request such as a web page form. If an available guest slot is available (not presently filled), the resident user is prompted (235&240) to provide pertinent information identifying the person that is to receive the invitation or offer, the service to be offered, and the terms of the offer. For example, the direct member ("host") creating the offer provides the name of the person ("pending guest") receiving the "guest invitation" and email address of the pending guest where the guest invitation is to be sent. Further, the host selects the type of service that is to be offered to the pending guest. For example, the host may be able to select from various levels of service (e.g., basic service, premium service, various mailbox sizes, maximum number of movies that can be rented at a time, etc.) or product types (e.g., instant messaging product, computer virus protection, email program, etc.). In addition, the host preferably specifies an expiration date ("end-date") at which the time the offer or invitation expires. However, the host may choose to not specify an end-date and leave the offer open-ended.

After receiving the pertinent information, a guest account is created (250) for the pending guest (by account server 110) and stored in an account database 115. The guest account contains information about the host that is sponsoring the guest account and the service(s)/product(s) that is being offered to the pending guest. In addition, the guest account contains information concerning when the guest account was created, the duration of the guest invitation or offer, and the current status of the guest invitation (which is "offered" signifying that a guest invitation has been offered to the pending guest). The direct member account of the host is also updated (260) with information concerning the newly created guest account, such as the dates of creation, expected date of expiration (if expressly stated), the current status, the identity of the pending guest, and contact information. After the direct member provides the pertinent information in block 240, the offer or invitation to become a guest of the host is sent (270) to the pending guest.

If a request is received (230) to offer an available guest slot and the guest slot is not, in fact, available, then some embodiments prompt (235&245) the direct member to upgrade his or her account to provide additional guest slots. For example, for a fee, a direct member may be able to purchase (247) additional guest slots or upgrade his or her level of service to a higher level that has more guest slots available. If additional guest slots are added, then a guest slot is available and the process continues and the pertinent information about the guest, service, and terms of service are requested by the direct member. If, however, a guest slot is not available and the host does not add an extra guest slot, then an attempt is not made (248) to process the request to offer a guest slot. Additionally, the pending guest is typically notified that the acceptance of the guest invitation can not be confirmed at this time.

If a guest invitation is sent to the pending guest, the guest invitation is, typically, sent via an email message to the email address of the pending guest. The guest invitation contains instructions for the pending guest to accept or decline the invitation. If an acceptance is received (274) to the guest invitation (e.g., in the form of an email reply or the activation of an encoded link in the guest invitation email message), the direct member account of the host is checked (276) to determine if a vacant guest slot is still available for the pending guest who sent the acceptance. If a vacant guest slot is available, the direct member account is updated (278) to reflect that the current status of the guest account has changed from offered to accepted. Further, the number of available guest slots is updated. The guest account for the user who accepted is also updated (280) and the status of the guest account is updated to accepted (from offered). The user who accepted the guest invitation is then instructed (282) on how to setup the service. Generally, the user is instructed via email or web-based communications. The host is also notified (284) that the user has accepted to become a guest of the host (via an email message, for example).

However, if an unfilled guest slot is not available, the host is notified (277) that a pending guest has attempted to accept an offer of guest sponsorship and there are insufficient numbers of guest slots. The host typically receives notification via an email message directed to an email address listed in the host's direct member account. In the notification email message, the host may be prompted to add an extra guest slot to accommodate the pending guest, to free up a current guest slot, or to withdraw the current offer to the pending guest. Accordingly, encoded web links may be included in the notification email message (to the host) for activating web page(s) that enable the host to implement the aforementioned changes. A separate notification message is also sent to the pending guest to inform the pending guest that his or her attempted acceptance of the guest invitation has been received and that processing of the attempted acceptance is being delayed due to the host reaching a maximum number of guests. In some embodiments, the notification message to the pending guest invites the pending guest to forego the opportunity to be a guest of the host and become a direct member of the network service environment 130. Accordingly, the notification message to the pending guest may contain an encoded web link that launches a web page for signing the pending guest up for direct membership.

If an acceptance is not received from the pending guest and a declination is received (292) from the pending guest, the host is then notified that the pending guest has declined to accept his or her offer of guest sponsorship. The guest account is then removed (294) (or scheduled for removal/deletion) from the account database 115, since the guest invitation is no longer pending or active. Also, the direct member account is updated (296) to reflect that the status of the respective guest account has changed from offered to declined. Further, the host is notified (via an email message, for example) that an outstanding offer (of guest sponsorship) has been declined (298).

Figure 3:
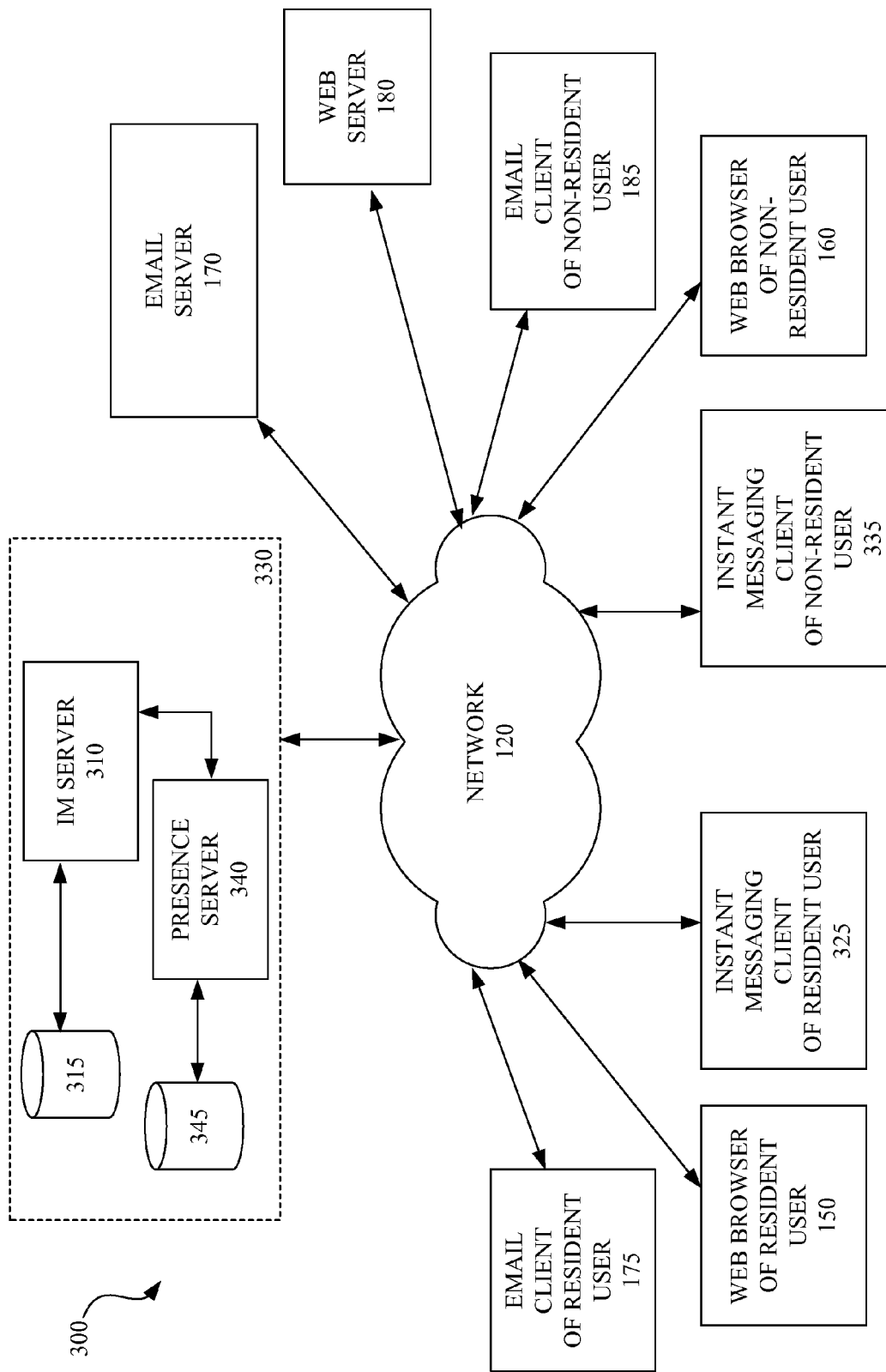
FIG. 3 is a block diagram showing one implementation of the system of FIG. 1 for an instant messaging service environment.

FIG. 3 is a block diagram showing one implementation of the system of FIG. 1. Specifically, FIG. 3 displays one embodiment 300 of component architecture for facilitating a network community for an instant messaging service environment 330 (one type of network service environment 130, among others). As shown in FIG. 3, one embodiment of a system for facilitating a network community comprises an instant messaging (IM) server 310. The IM server 310 manages tasks and services associated with an instant messaging network 330. For example, the IM server 310 manages accounts (or profiles) of users of the instant messaging network 330. The member accounts (direct and indirect) are maintained in an account database 315 that is in communication with the IM server 310 where the IM server 310 is accessible via a communication network 120, such as the Internet.

Accordingly, an instant messaging client 325 of a member of the instant messaging service environment 330 can log on to the instant messaging network 130 by providing proper authorization to the IM server 310 that matches information contained in the member's account at the account database 315 that is used to authenticate the user. The IM server 310 then notifies other IM clients 335 that the user has logged onto the IM server 310 of the instant messaging network 330.

In some embodiments, each IM client 325, 335 sends the IM server 310 connection information, such as the IP address and the number of the port assigned to the IM client 325 and the name and IP address of everyone in an IM roster (e.g., a buddy list) associated with the user of the IM client 325. The IM server 310 then forwards the roster information to other IM clients 335 so that two IM clients 325, 335 can communicate directly with each other. In one embodiment, the instant messaging network 330 is a real-time communications platform based on open protocols and Extensive Markup Language (XML). In the embodiment shown, the functionality of the application server 140 and account server 110 of FIG. 1 have been consolidated into the functionality of the IM server 310.

In some other embodiments, instant messages can pass through the IM server 310. Accordingly, the IM server 310 receives information from one IM client 325 and transfers the information to another IM client 335 along with presence information. The IM server 310 functions independently from other IM servers and can communicate with other IM servers that are connected to the network 120.

A presence server 340 monitors presence information of the IM client 325 and notifies the IM client 325 of the presence information of other IM clients 335 and their associated users. Each IM client 325, 335 communicates with and receives presence information from the IM server 310 that is in communication with the presence server 340. Accordingly, a user sets roster contact parameters on the type of presence information of other persons or "contacts" that the user wants to receive from the IM server 310 and presence server 340. Note, in some embodiments, the functionality of the presence server 340 may be performed by the IM server 310.

A direct member may designate roster contact parameters in a roster list (or buddy list), for example. Within the roster contact parameters, the direct member identifies other users (or buddies, contacts, etc.) that the direct member wants to monitor. In addition, guests of the direct member and pending guests (persons to whom the direct member has extended a guest invitation) are preferably included in the roster list of the direct member. The roster contact parameters in the roster list are then stored in a storage medium, such as the account database 315, for example, that is accessible by the IM client 325, 335 or the IM server 310. In other embodiments, the roster contact parameters are typically stored in a storage medium that is accessible by the IM client, such as an internal disk drive of a general purpose computer or the memory of a mobile device, and a copy of the roster contact parameters is given to the IM server 310. Other information may also be contained in the roster contact parameters such as the instant messaging addresses of the contacts identified in the roster list.

IM client 325, 335 is preferably adapted to handle normal IM functions that may include handling translations of IM functions from various protocols into XML-structured information. The IM client 325, 335 includes software applications that assists a user in communicating with contacts via an IM session. In this regard, the IM client 325, 335 may be stored in a personal computer, a handheld computer, a cellular telephone having IM capabilities, an i-pager, or any network-compatible device.

Each IM client 325, 335 includes a chat window and a roster window. In an example, the roster window displays the availability of contacts on the user's roster list. The IM client 325, 335 is preferably configured to provide presence information to presence servers 340 and to query presence servers 340 (via the IM server 310) for presence information. In addition, an account server 110 or IM server 310 is preferably configured to also provide presence information to presence servers 340. In an example, presence information can be represented as states such as: 1=online—present; 2=online—away; 3=online—extended away; 4=online—do not disturb; 5=offline; 6=pending; 7=active: where, a present state indicates the user is available for a chat session; an away state indicates the user's client has experience no activity such as keystrokes or mouse movement for a defined period of time; an extended away state indicates the user's client has had no activity for a period of time greater than the away time frame; a do not disturb state indicate the user is not available for a chat session; an offline state indicates the user has logged off the system; a pending state indicates that the user has received an invitation or request to become a guest of a direct member but the invitation has not yet become accepted, activated, or declined; and an active state indicates that the user has accepted an invitation or request to become a guest of a direct member but has not yet logged into the application server 140 for the first time.

When the presence server 340 in one preferred embodiment performs a query to obtain presence information about a user, the IM client 325 of the user returns presence information via a number from 1-7 that represents the current state of the user's client 325. When a chat message is attempted to be sent between users where a user's presence is state 4, 5, 6, or 7 i.e., online-do not disturb, offline, pending, or active the chat message will be undeliverable. In the example, as a user's presence changes, the presence change information will be sent to the presence server 340 (from an IM client 325, IM server 310, or account server 310) and directed from the presence server 340 to other clients in the system that have a roster list containing the user as a contact. Accordingly, the presence of a person who has been extended a guest invitation and has not responded may be placed in a "pending" presence state by the presence server 340.

For example, upon creation of a guest account, a status indicator (e.g., a status flag) within the guest account is set to the current status of the guest account (e.g., 1=offered; 2=accepted; 3=ready; 4=declined; 5=canceled; and 6=awaiting upgrade of guest list, etc.). The presence server 340 (via the IM server 310) can then retrieve the current status (as represented by the status indicator) of the guest account and associate the current status with a particular presence state for the user. For instance, if the current status of the guest account is "offered," a presence state of "pending" may be associated with the user of the guest account. Further, if the current status of the guest account is "accepted" or "ready," a presence state of "active" may be assigned with the user of the guest account.

In some embodiments, the user's contact name is then represented by the user's email address (e.g., chip@bb.net) while the user has a "pending" presence state. Alternatively, when the current status of the guest account changes from "offered" to "accepted," then the presence state for the user changes from "pending" to another presence state, such as "active." Subsequently, during the guest account setup process, the user selects an instant messaging screen-name. Therefore, when the presence state of the user changes from "pending" to "active," his or her contact name also changed from his email address to his or her selected screen-name. Correspondingly, when the user logs into the IM server 310 for the first time, then the presence state of the user of the guest account changes from ready to present, do not disturb, etc., for example.

Diversely, if the current status of the guest account changes from offered to declined, the presence server 340 sends a request (via the IM server 310) to IM clients 325 with roster lists (that contain the user) to remove the user from their roster list, since the user has declined the offer of guest sponsorship. Generally, if a user is online, the presence state of the user is represented by an online presence state (online-available, online-away, online-busy) that is determined from the user's IM client. If the user is offline, however, the user's presence state is determined from a different form of presence data provided by the status of the user's guest account.

Figure 4:
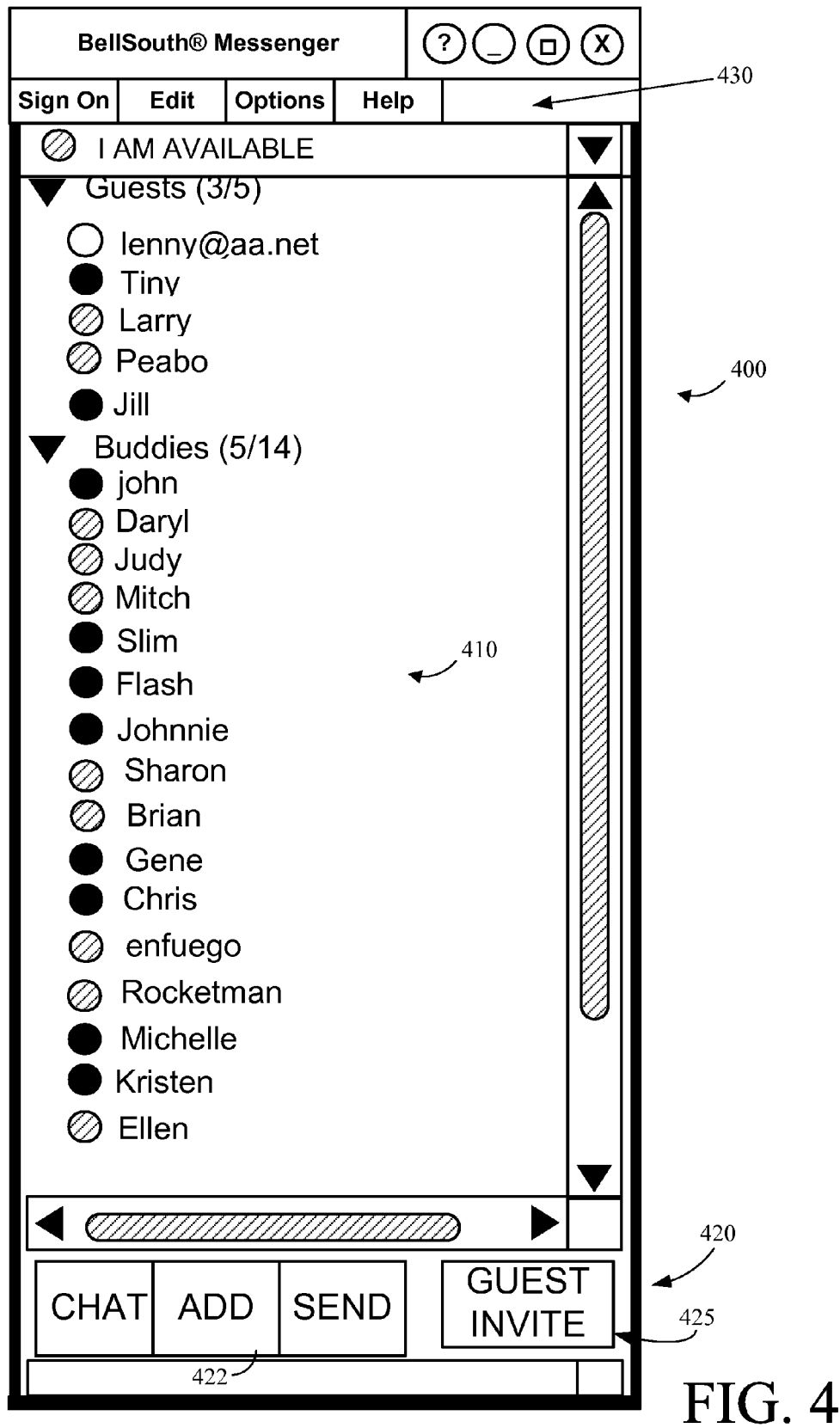
FIG. 4 is a diagram showing one embodiment of a user interface for an instant messaging client in the system of FIG. 3.

FIG. 4 is a diagram showing one embodiment 400 of a user interface for the IM client 325 of a direct member. The user interface shows an example roster list 410 for a direct member. For each of the contacts in the roster list 410, an indication appears beside the contact's name, which indicates the presence status of the contact. These indications, in a preferred embodiment are shown in different colors to easily differentiate differences in presence information (e.g., not present, present, available, busy, pending, active, etc.). Thus, for example, the indication for available contacts (e.g., Larry, Peabo, Daryl, etc.) may be shown in green (shown in FIG. 4 as hashed circles), the indication for busy contacts (e.g., Tiny, Jill, Slim, etc.) may be shown in gray (shown in FIG. 4 as filled circles), and the indication for pending contacts (e.g., lenny@aa.net) may be shown in red (shown in FIG. 4 as blank circles). The user interface also provides the direct member with additional selections 430, such as an edit menu, an options menu, a sign-on menu, a help screen, all of which would initiate another interface area (e.g., window, screen, etc. (not shown)) for the direct member to accomplish those functions, as would be understood by one of ordinary skill in the art.

In addition, the roster list includes user options 420, which permit the direct member to chat with a contact, add a new contact 422 (which is distinct from adding a new contact of a recipient of a guest invitation), send a message or file to a contact, and send a guest invitation via a guest invite button 425 (which in some embodiments, adds a new contact of the recipient of the guest invitation). If the direct member selects the guest invite button (i.e., logic for displaying a button representation that affects associated functionality when selected by a user with an input device), then a user interface for generating and managing a guest invitation requests is launched or instantiated as is commonly understood in the art.

Figure 5:
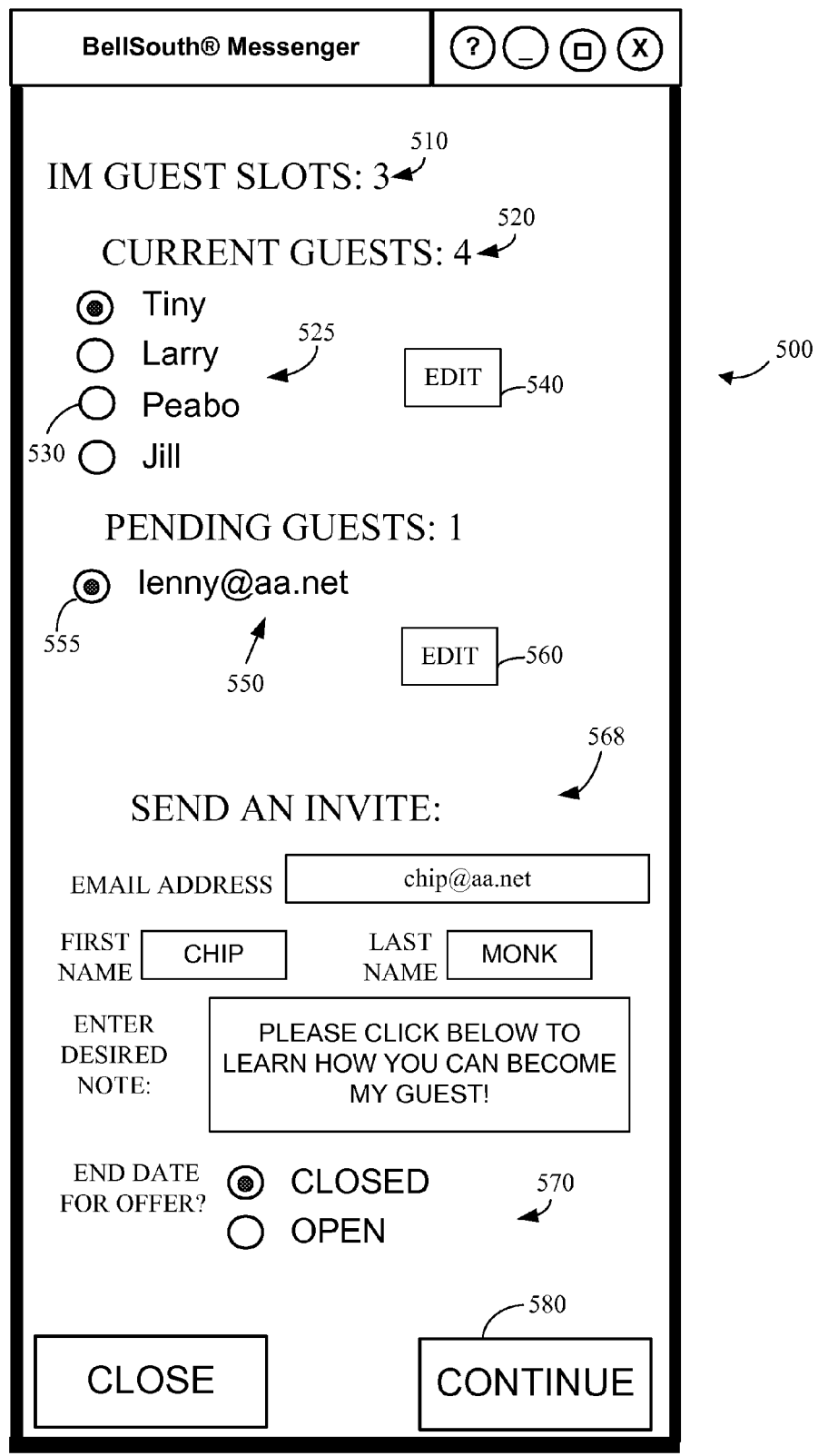
FIGS. 5-6 are diagrams showing one embodiment of a user interface for generating and managing a guest invitation request in the system of FIG. 3.

FIG. 5 is a diagram showing one embodiment 500 of a user interface for generating and managing a guest invitation request. As shown in FIG. 5, the user interface displays the number 510 of guest slots that a direct member has remaining under his or her direct member account. Also, the number 520 of current guests 525 of the direct member are identified. Next, to each guest's identifier is a selection button 530 that may be selected. Upon a selection of the selection button 530 and an edit button 540, a mechanism for modifying settings associated with a current guest is launched. Settings, such as the end-date that specifies the date for terminating the hosts guest sponsorship of the respective user may then be modified, along with other settings that include cancellation of the offer of guest sponsorship, modifying services or products offered, etc.

The user interface 500 further identifies person(s) ("pending guests") 550 who have been sent an offer to become a guest of the respective user and have not accepted or declined the offer at the present date. Next, to each guest's identifier is a selection button 555 that may be selected. Upon a selection of the selection button 555 and an edit button 560, settings associated with a pending guest may be modified, such as the end-date that terminates the host's offer of guest sponsorship ("guest invitation") to the respective user. Other settings include cancellation of the guest invitation, modifying services or products offered, etc.

In one embodiment 500, to make and extend a new offer ("guest invitation") to someone ("pending guest") to become a guest of the respective user, the respective direct member can fill in the requested information 568 at the bottom of the user interface. The requested information 568 includes an email address of the person that is receiving the invitation offer and the name of the person. Also, a customized annotation or note may be provided in a text box for the person receiving the offer. In some embodiments, a default annotation may be provided in the text box that may be modified or typed-over by the respective user.

Next, the respective user selects to specify an open or closed end-date for guest sponsorship of the user. For example, the respective user may select the open option 570 to not presently specify an end-date. At a later time, the respective user may choose to specify an end-date, however, by modifying the settings as described above.

Alternatively, the respective user can choose to presently specify an end-date by selecting the closed option 570 which triggers the launching of a user interface (after selection of the continue button 580) for specifying an exact date for termination of the guest sponsorship and removal of the guest account (e.g., Nov. 12, 2005).

Figure 6:
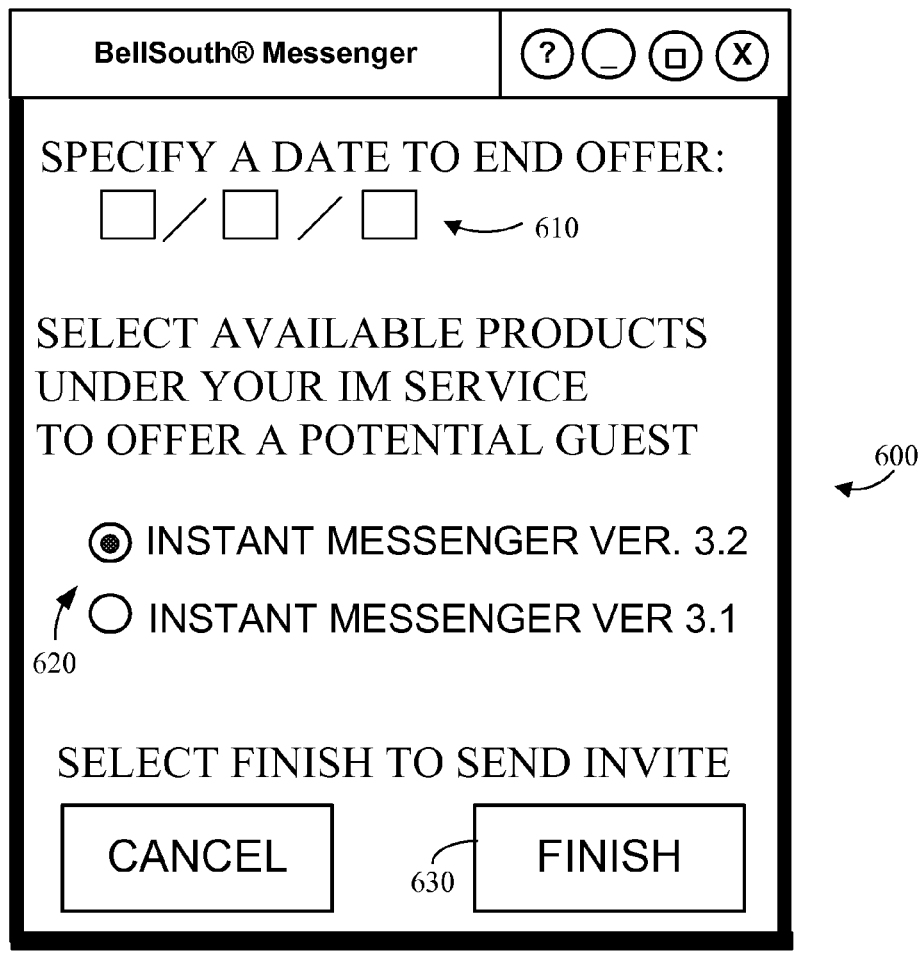

Selection of the continue button 580 launches a user interface 600 for providing additional information, as shown in FIG. 6. If the closed option 570 in FIG. 5 was previously selected, then the end-date 610 for the guest sponsorship can be provided in the user interface 600 of FIG. 6. Further, the respective user can specify the particular services or products 620 that are offered to the intended recipient of the guest sponsorship. After the additional information is selected, selection of the finish button 630 initiates the sending of the offer ("guest invitation") of guest sponsorship to the intended recipient ("pending guest").

Figure 7:
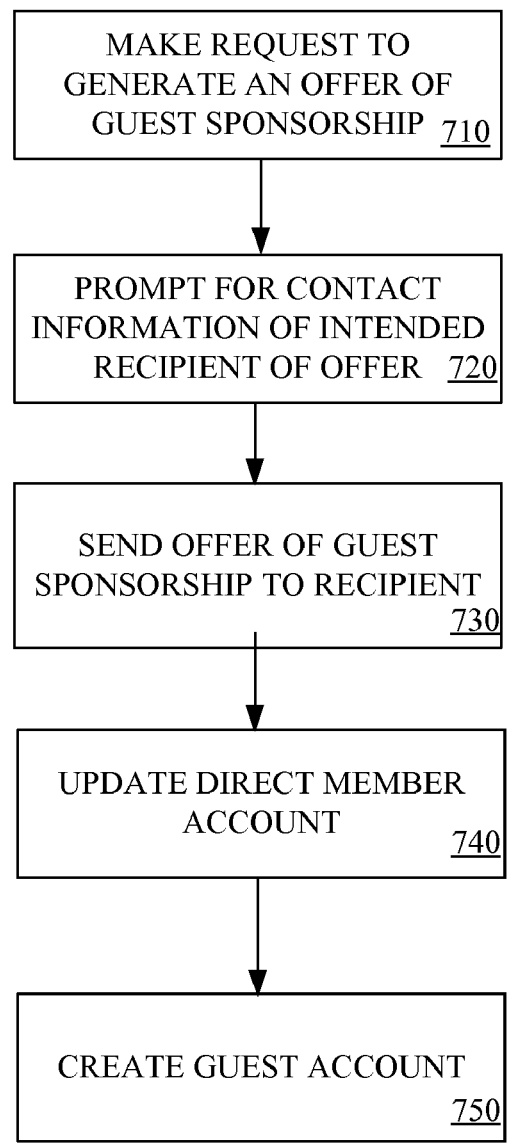
FIG. 7 is a flowchart describing one embodiment of a method for making an offer of guest sponsorship in the system of FIG. 1.

As depicted in FIG. 7, a representative embodiment of a method 700 for making an offer of guest sponsorship ("guest invitation") may be construed as beginning at block 710. First, a request is made (710) to generate an offer of guest sponsorship ("guest invitation") to an intended recipient by a direct member. For example, an email message describing the offer is generated (by an application client 125 of resident user) and sent to the intended recipient from the direct member, in some embodiments. To generate the offer, the direct member ("host") making the request is prompted (720) to provide contact information for the intended recipient, such as the recipient's name, email address, etc. A guest invitation or offer is then sent (730) to the recipient (via an email-formatted message, for example) for a service or product that is to be sponsored by the host. For example, in FIG. 6, the product "Instant Messenger Ver. 3.2" 620 is offered to a pending guest by executing a Simple Mail Transfer Protocol (SMTP) program that sends the email message through an email server 170 to the email address of the recipient.

Next, the direct member account of the host is updated (740) with the information concerning the recipient of the invitation, the date the invitation was sent, the end-date for the offer and/or sponsorship, identification of the services and/or products offered, etc. Also, a guest account is created (750) for the recipient ("pending guest") that includes information about the pending guest, the host, and the guest invitation (e.g., start date, end-date, services/products offered, etc.).

In some embodiments, a guest invitation is sent in the form of an email message with an embedded encoded web link contained within the email message. The encoded web link contains rudimentary information for creating a guest account upon activation of the link. Such information includes an email address of the recipient, host-identifying information, service identification, etc. In some embodiments, the current specified end-date of the offer of guest sponsorship is also provided to the pending guest via the guest invitation.

After the guest invitation is generated and sent to the intended recipient, a guest account is created for the intended recipient (pending guest), as is discussed below with regard to FIG. 8, and the direct member account is updated with information about the guest invitation, as discussed hereinafter. The guest account has a similar format to the direct member account so that it each can be easily and efficiently managed. For example, upon creation, the guest account is set up with the same data fields as a direct member account; however, some data fields are only used for a direct member account and not for a guest account and vice versa. In this way, each account shares a similar organizational structure.

By creating a guest account before acceptance by the pending guest who has received the offer of guest sponsorship from a host, the presence of the pending guest can be monitored by the host while the guest account is pending, as explained previously. After a guest sponsorship is declined by a user and is no longer pending, the respective guest account is subsequently canceled and deleted. Thus, the presence of the pending guest is no longer ascertainable.

With regard to the instant messaging embodiment shown in FIG. 3, the creation of a guest account before acceptance of an offer by the pending guest allows presence information to be tracked in the guest account and the associated direct member account. Therefore, a host can monitor the state of the pending guest of the host as "pending" or "ready." Accordingly, after an offer of guest services has been sent, the roster list of the host, in some embodiments, is updated to include the pending guest as a new contact with the pending guest's email address listed (e.g., chip aa.net). Note, this is distinct from the conventional process of adding a user to a contact list by selecting the add button 422. If the pending guest accepts the offer, the "guest" can specify a screen-name that replaces the email address in the roster list. Also, at this time, in some embodiments, the "guest" can then choose to import the roster list of the host. Alternatively, if the pending guest declines the offer of guest sponsorship ("guest invitation"), the contact information (e.g., chip aa.net) for the pending guest (non-resident user) is removed from the roster list.

Figure 8:
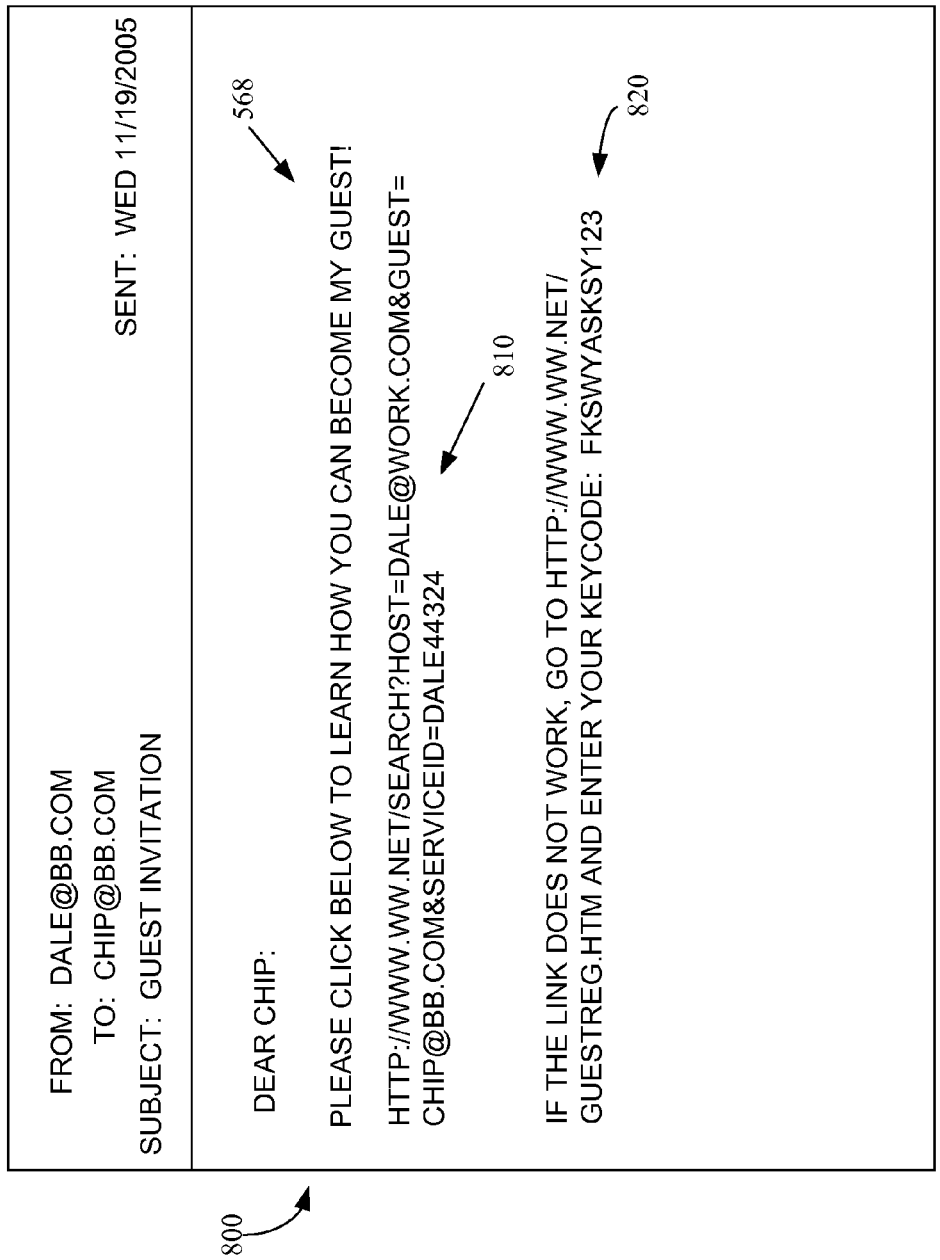
FIG. 8 is diagram showing one embodiment of a guest invitation utilized in the system of FIG. 1.

FIG. 8 is a diagram showing one embodiment of a guest invitation 800 in the form of an email message. The email guest invitation 800 identifies the resident user 810 who has sent the invitation and contains the annotation 568 provided in FIG. 5. Instructions are also enclosed informing the recipient to activate (e.g., by clicking on the link with a mouse input device) the encoded web link 820. The encoded web link 820 contains information identifying an Internet address of a web server 180 and other information including the originator of the invitation (e.g., host's primary email address), the email address of the recipient ("pending guest"), and a service identification label (service ID) identifying the type of service or product being offered to the recipient. Upon activating the encoded web link 820, the web server 180 receives the information included in the link 820 and transmits a web page for a web browser of the recipient. For example, activation of the web link 810 (via a mouse click, for example) invokes the user's email client to pull the web page from a web server 180 for the user ("pending guest") to accept or decline the offer of guest sponsorship contained in the email message.

Typically, a pending guest may accept and activate a guest account via a web browser 160. To activate the profile or account, in one embodiment, the pending guest provides information (e.g., a code, key 820, password, etc.) provided within the guest invitation 800 to verify that the pending guest was invited to be a guest of a particular direct member. Additional information typically provided by the pending guest and included in the guest account includes a distinct username and password that the pending guest can later use to verify himself or herself as a registered guest of the direct member sponsoring the guest. Additional information is also included in the guest account, such as the identity of the direct member ("host") that is sponsoring the guest and identification of particular applications and services (e.g., a service ID number) to which the user has been offered access.

After accepting the guest invitation, the guest account (that was created after the transmission of the guest invitation) and the direct member account sponsoring the guest account are updated to indicate that the pending guest has accepted the guest invitation. Particularly, the web server 180 notifies the IM server 310 to update pertinent information in the direct member account and the guest account. For example, the web server 180 can send an XML datagram to the IM server 310 (for updating respective member accounts) with guest, host, and service information after activation of the web link and retrieval of a web page from the web server. Also, after a guest accepts an invitation, in some embodiments, the web server 180 retrieves instructions for the guest to download and set up software for performing applications that are authorized for the guest.

By declining the invitation, the guest account and direct member accounts are updated to indicate that the guest invitation has been declined by the pending guest. Particularly, the web server 180 notifies the IM server 310 to update the status of the guest invitation to "declined" within the direct member account. Further, the IM server 310 schedules for the guest account to be deleted by setting the end-date of the guest account, for example. Acceptance or declination of the offer of guest sponsorship causes the status indicator of the guest account to be changed to a new state (e.g., accepted, declined, etc.).

Figure 9:
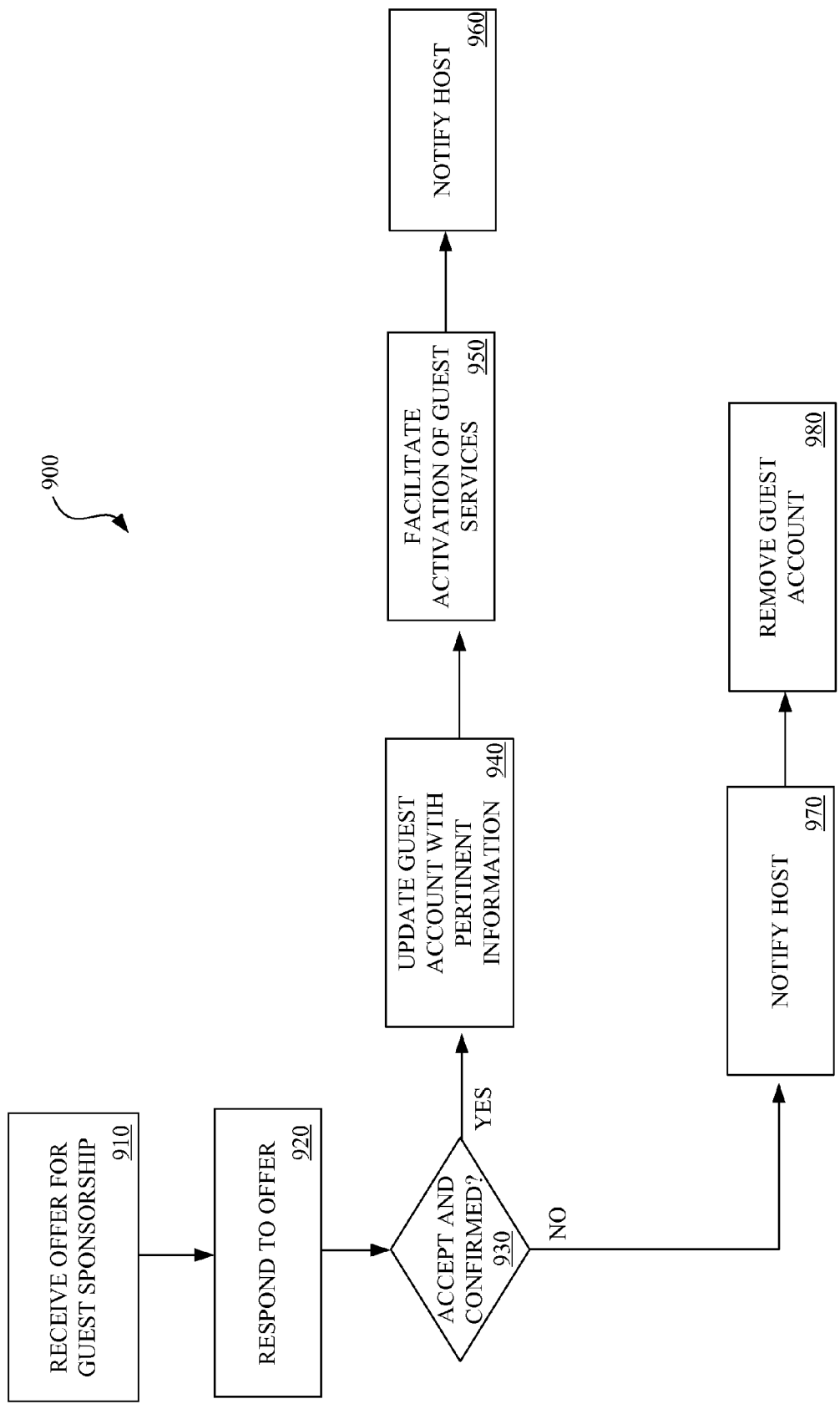
FIG. 9 is a flowchart describing one embodiment of a method for responding to an offer of guest sponsorship in the system of FIG. 1.

FIG. 9 describes a representative embodiment of a method 900 for responding to an offer of guest sponsorship. When a non-resident user receives (910) an email offer of guest sponsorship (via a guest invitation), the non-resident user (pending guest) responds (920) to the offer by either accepting or declining the offer. If the user accepts (930) the offer (by clicking on an encoded hypertext link 820 in the email offer 800 and subsequently agreeing to accept the terms of the offer via a web interface) and the acceptance is confirmed, the guest account is updated with pertinent information about the guest account (such as information about the user, start date of the offer, scheduled end-date of the offer, etc.). The non-resident user may then begin the process of activating the guest services being offered by the host. For example, the user may start downloading additional software, configuring his or her computer, initiating service by logging into application server, etc. If the non-resident user accepts the offer of guest sponsorship, the non-resident user notifies (940) the host about the acceptance of the offer via an email message. Alternatively, if the non-resident user does not accept (930) the offer, the host is notified (970) (via an email message, for example), and the guest account is removed (980) or deleted or scheduled for deletion from the account database 115 that stores the guest account.

Figure 10:
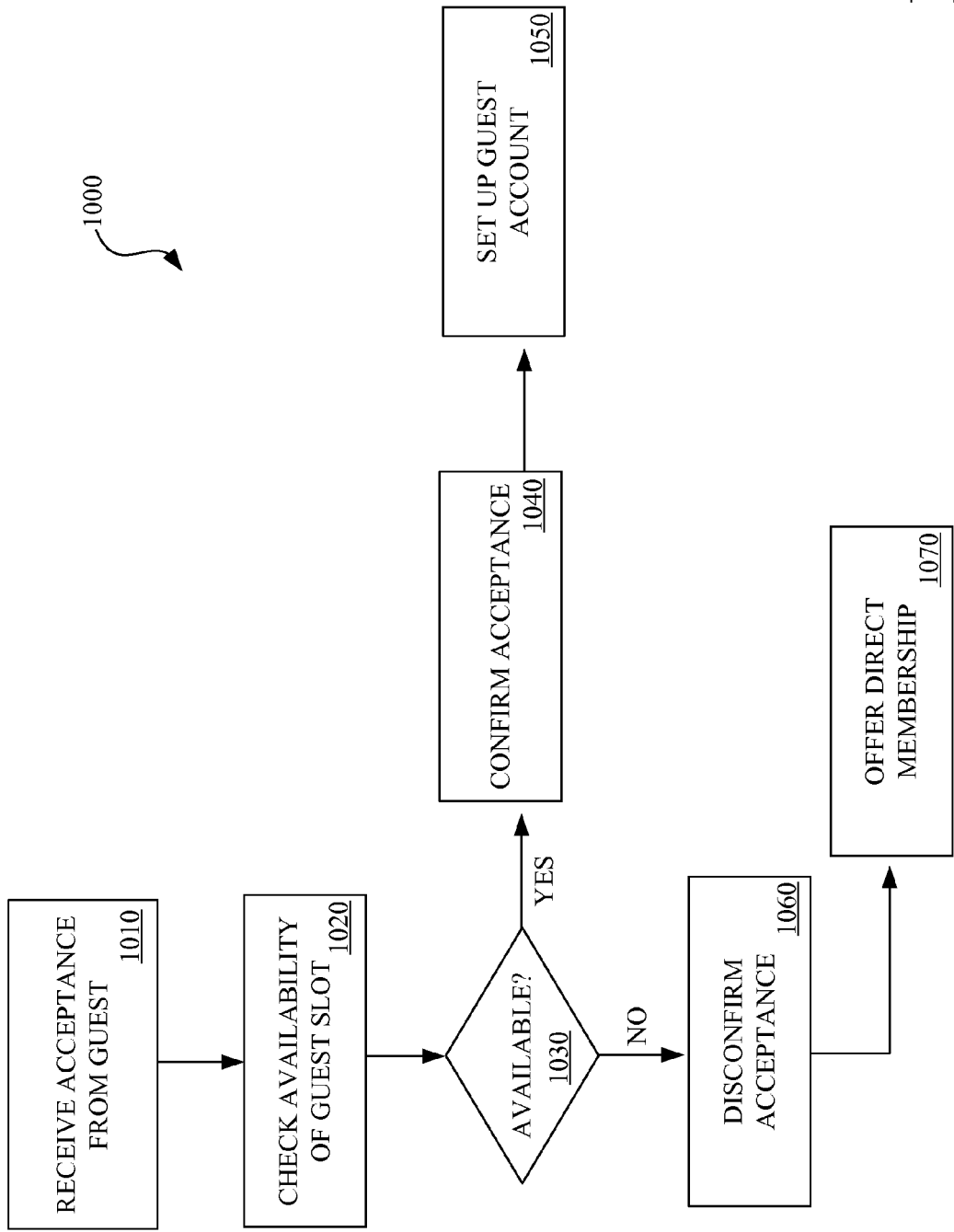
FIG. 10 is a flowchart describing one embodiment of a method for processing an acceptance of an offer of guest sponsorship in the system of FIG. 1.

Correspondingly, FIG. 10 describes a representative embodiment of a method 1000 for processing an acceptance of an offer of guest sponsorship (i.e., a guest invitation). First, an acceptance from an offer (e.g., in the form of an email message) of guest sponsorship is received (1010) from a non-resident user (pending guest). Typically, the pending guest clicks on an encoded hypertext link 810 in an email message 800 to retrieve a web page with the option of accepting or declining the offer (via a particular selection button, for example). When the pending guest chooses to accept the offer by clicking on a web link or button, for example, the clicking of the link/button prompts the web browser 160 of the user to inform a web server 180 that the user has accepted the offer. Then, the direct member account of the host is checked (1020) to determine if a guest slot is currently available for the pending guest who has accepted the offer. For example, in some embodiments, the web server 180 communicates with the accounts database 115 (or an IM server 310 in an instant messaging model) to determine if the host has an available guest slot. If a guest slot is available (1030), then the direct member account of the host is updated to indicate that a guest slot has been filled by the pending guest. In addition, the pending guest receives (1040) confirmation of the acceptance of the offer. For example, in some embodiments, the web server 180 sends a web page to the web browser 160 of the pending guest confirming acceptance of the offer. Additionally, the guest account for the new guest is set up with additional information (provided by the user) such as a username for the guest account, password, a screen-name, contract information, etc. that is used for setting up the offered product, application, or service.

Alternatively, if the guest slot is not currently available (1030) for the pending guest, the acceptance is disconfirmed (1050) to the pending guest. For example, after checking the member account of the host and verifying that all of the guest slots of the host are currently filled, the web server 180 sends a web page to a web browser 160 of the pending guest to inform the pending guest that the acceptance of the offer can not be granted since the host has the maximum number of guests allowed under his or her account settings. Accordingly, in some embodiments, the pending guest is then offered (1060) an opportunity to become a direct member of the network service environment 130, since the pending guest has been denied the opportunity to become a guest of the network service environment 130. For example, in some embodiments, the web page that notifies the pending guest of the unavailability of a guest slot also provides instructions for registering the pending guest can become a direct member of the network service environment 130.

Figure 11:
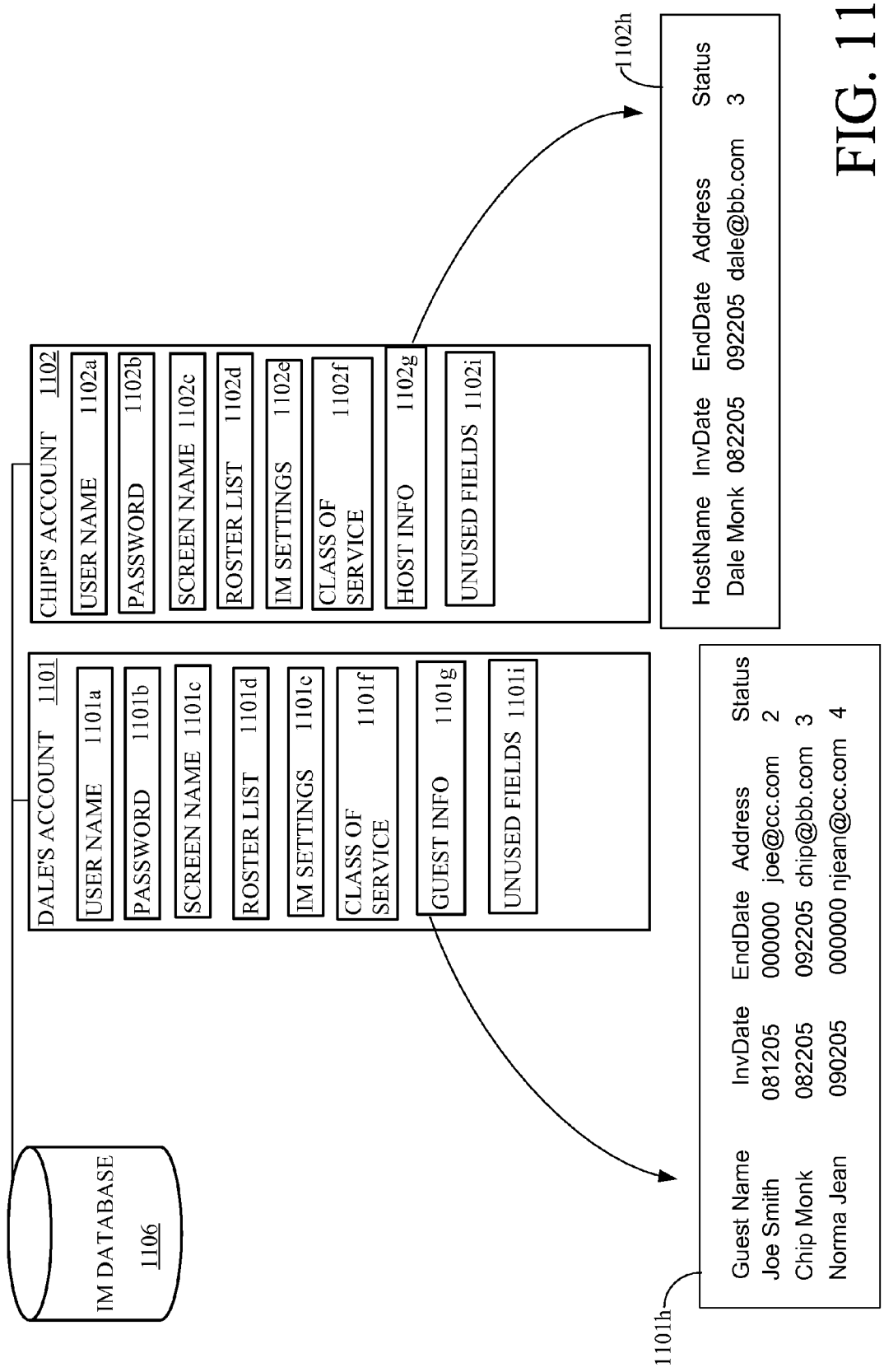
FIG. 11 is a diagram showing one embodiment of the format of member accounts within an account database in FIG. 3.

FIG. 11 is a diagram showing one embodiment of the organization of member accounts in an account database of the instant messaging environment of FIG. 3. In one embodiment, the account database 1106 has XML accounts or profiles for each direct and indirect member of the instant messaging service environment 330. Such accounts include a collection of settings and preferences for the member's IM accounts. Profiles may also include a collection of settings for other products/applications or services, such as email, web-based forums, etc.

Consider, a direct member account belonging to "Dale." Dale's direct member account 1101 includes a username 1101a and a password 1101b. Each of the member accounts also contain additional information stored by the user associated with the account. For example, a screen-name 1101c, a roster list 1101d, other IM settings 1101e, and a class of service marker 1101f. With regard to the roster list 400 (as shown in FIG. 4, for one embodiment), the direct member can specify a number of contacts 410 (or buddies) at his or her inclination. Typically, these contacts 410 are those people with whom a user often communicates. The contacts 410 listed may be arranged into more than one category. Other data fields 1101i may also be contained in the direct member account that are unused. For example, data fields that are exclusively used in guest accounts may also be contained (but not used) in a direct member account. In this way, direct member accounts and guest accounts share similar formats and can therefore be managed in a similar manner.

With respect to the class of service marker 1101f, the class of service marker 1101f may be used to indicate a level of membership (e.g., basic-direct, premium-direct, basic-indirect, etc.) to authorize and/or restrict access to various resources. These resources can be other users, applications residing on a server, or even a network connection socket. The class of service marker 1101f would be copied to the client upon a respective user (e.g., Dale) logging in to the IM server 310 (or account server 110) and would be included with a service request received from the application client (e.g., instant messaging client 325) of the user. It should be recognized that the class of service marker 1101f can be used to facilitate a variety of different advantageous transactions.

Dale's direct member account 1101 also contains guest information 1101g, such as the number of guests he is authorized to have under his account and the number of active guests he currently is sponsoring. In particular, Dale's direct member account includes information concerning each guest invitation that has been offered by Dale. For example, as shown, a guest list 1101h is included in the diagram of FIG. 11. Each entry in the list includes the name of the recipient, an invitation date ("InvDate") to indicate the date that the offer (guest invitation) was made to the recipient, an end-date ("EndDate") to indicate if and when the offer of guest sponsorship is to conclude, an email address ("Address") for the pending or current guest, and the current status ("Status") of the guest invitation. The end-date can be dependent upon a stated event, such as user activity of the guest or pending guest. For example, an end-date may be set to occur three days after the detection of the next instance of user activity. In this way, the end-date may be a variable date. Alternatively, a fixed end-date may be set according to the offered product or service. Also, a fixed end-date, in some embodiments, may be set by the host. If the product/service or the host does not specify an end-date, the end-date is open, unless the guest himself or herself specifies an end-date. In this way, the guest can also manage his or her guest account. Note, in some embodiments, a notification (e.g., an email message, an instant message, etc.) is sent to the host when the host's guest modifies the end-date, and correspondingly, a notification is also sent to the guest when the host modifies the end-date. Other embodiments may feature other data fields that are pertinent to the products and services offered and pertinent to account maintenance, for example.

The current status ("Status") of a particular guest invitation that was offered by a respective user is indicated by a status indicator. In some embodiments, status indicator information can be represented as classifications such as: 1=offered; 2=accepted; 3=ready; 4=declined; 5=canceled; and 6=awaiting upgrade of guest list: where, an offered status indicates that a guest invitation has been offered and a response has not been received. An accepted status indicates that a guest invitation has been offered and accepted but set-up has not been completed. Accordingly, an accepted state implies that a pending guest has accepted a guest invitation and has not yet utilized the services and/or products authorized in the guest account. Correspondingly, a ready status indicates that a guest invitation has been offered, accepted by the recipient of the guest invitation, and the guest account set-up procedure has been completed (e.g., logging into the respective application server for the first time may be indicate a completed set-up). Therefore, once the pending guest has installed the appropriate software and executed the software for the first time (e.g., log in to the application server for the first time), the status of the respective guest invitation changes from "accepted" to "ready." As such, a host can check to see if a guest has accepted an offer of guest sponsorship by retrieving the status indicator (for that guest) from his or her direct member account.

Correspondingly, a declined status indicates that a guest invitation has been offered and declined by the pending guest. A canceled status indicates that a guest invitation has been offered and canceled by the originator of the offer (i.e., host). Further, a canceled status indicator implies a time to sunset the guest account, after a host or a guest has requested cancellation of a guest account. For example, a provider of the network service environment 130 may not want to lose a canceled guest as a member of its network service environment 130. Therefore, actual cancellation of the guest account (e.g., removal of the guest account from the account database 115) may be set to occur a set period of days after the date that the guest or host requested the cancellation. This gives time for the provider to offer a direct membership to the canceled guest.

An "awaiting upgrade of guest list" status indicates that a guest invitation has been offered and accepted but there are not any current guest slots available (under the direct member account of the host). The awaiting upgrade of guest list status indicator therefore implies that an application server 140 (e.g., IM server 310) has received an acceptance (from a pending guest) to a guest invitation, but the host that created the guest invitation does not have any available guest slots for the pending guest. Therefore, the guest account of the pending guest is placed into a state of waiting for the host to create an available guest slot by adding a guest slot, for example. Accordingly, the host can upgrade his or her guest list by adding more guest slots or by canceling another offer of guest sponsorship that is associated with a filled guest slot so that this guest slot can be used for the present offer of guest sponsorship.

The IM account database 1106 also has guest accounts (or profiles) for persons (e.g., non-resident user, indirect member) that have been sent a guest invitation from a direct member. Consider, a guest account belonging to "Chip" and sponsored by Dale. Like a direct member account, Chip's guest account 1102 includes a username 1102a, a password 1102b, a screen-name 1102c, a roster list 1102d, other IM settings 1102e, and a class of service marker 1102f. Other embodiments may feature other data fields that are pertinent to the products and services offered and pertinent to account maintenance, for example. Further, some data fields 1102i may also be contained in the guest accounts that are unused. For example, data fields that are exclusively used in direct member accounts may also be contained (but not used) in a guest account. In this way, direct member accounts and guest accounts share similar formats and can therefore be managed in similar manners.

Guest accounts (e.g., Chip's guest account) also include pertinent information concerning the guest account, such as host information 11102g. Host information 1102g includes information concerning the guest invitation that has been offered to the recipient. For example, as shown, a host list 1102h is included in the diagram of FIG. 11. Each entry in the list includes the name of the host, an invitation date ("InvDate") to indicate the date that the offer (guest invitation) was made to the recipient, an end-date ("EndDate") to indicate if and when the offer of guest sponsorship is to conclude, an email address ("Address") for the pending or current guest, and the current status ("Status") of the guest invitation. If the end-date has not been specified by the host or the guest, a numerical identifier such as "000000" can be used to represent an open or unspecified end-date.

As described above with regard to Dale's direct member account, the current status of the guest account is also indicated by a status indicator. In some embodiments, status indicator information can be represented as classifications such as: 1=offered; 2=accepted; 3=ready; 4=declined; 5=canceled; and 6=awaiting upgrade of guest list, as described above. Therefore, when the IM client 335 performs a query to the IM server 310 for the status of the guest account 1102, the IM server 310 returns the status information via a number from 1-6 that represents the current state of the guest account 1102.

Upon a query from an IM client 335 of the guest, the IM server 310 can access the status information in the guest account and send the status information to the IM client 325 of the guest. Also, a presence server 340 may also access the status information 1102h to provide presence information regarding a pending guest of the host, as is described hereinafter. With regard to the roster list, the indirect member or guest (e.g., Chip) can specify a number of contacts (or buddies) at his or her pleasure. Typically, these contacts are those people with whom a user often communicates. The contacts may be arranged into more than one category.

Figure 12:
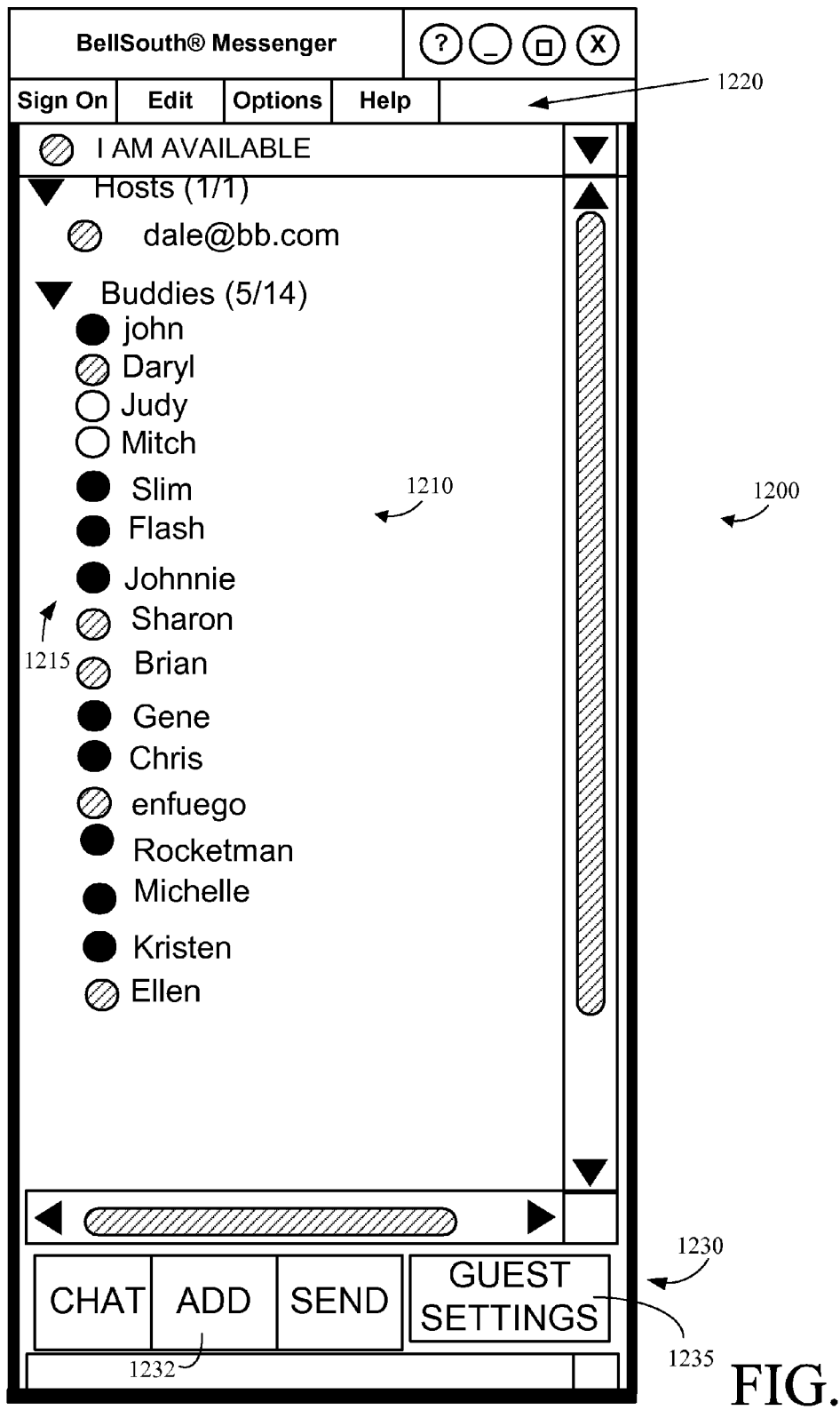
FIG. 12 is a diagram showing one embodiment of a user interface for an instant messaging client of a guest in the system of FIG. 3.

FIG. 12 is a diagram showing one embodiment 1200 of a user interface for the IM client 335 of a guest of the host. It shows an example roster list 1210. For each of the contacts in the roster list 1210, an indication appears beside the contact's name, which indicates the presence status of the contact. These indications, in a preferred embodiment are shown in different colors to easily differentiate differences in presence information (e.g., not present, present, available, busy, etc.). Thus, for example, the indication for available contacts (e.g., Larry, Peabo, Daryl, etc.) may be shown in green (shown in FIG. 12 as hashed circles), the indication for busy contacts (e.g., Tiny, Jill, Slim, etc.) may be shown in gray (shown in FIG. 4 as filled circles), and the indication for "not present" contacts (Judy, Mitch) may be shown in green (shown in FIG. 12 as blank circles). In some embodiments, the roster list for a guest may be imported from the host. In this way, a host can provide a roster list to each of his or her guest to make communication among an association of users easy and effective. The user interface also provides the user with additional selections 1220, such as an edit menu, an options menu, a sign-on menu, and a help screen, all of which would initiate another interface area (e.g., window, screen, etc. (not shown)) for the user to accomplish those functions, as would be understood by one of ordinary skill in the art.

In addition to the available contacts, the roster list 1200 includes user options 1230, which permit the user to chat with a contact, add a new contact 1232 (in a conventional sense), send a message or file to a contact, and to configure guest settings. If the user selects the guest settings button 1235, then a user interface for managing a guest account is launched or instantiated as is commonly understood in the art.

Figure 13:
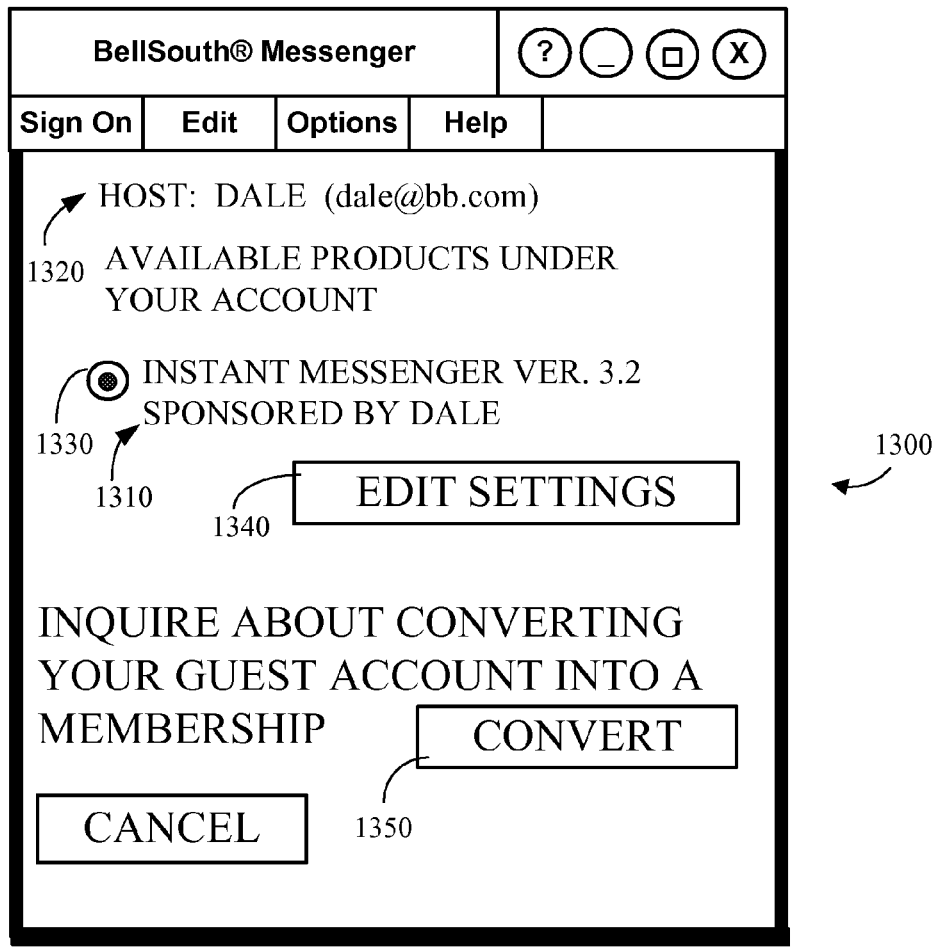
FIG. 13 is a diagram showing one embodiment of a user interface for managing a guest account in the system of FIG. 3.
Figure 14:
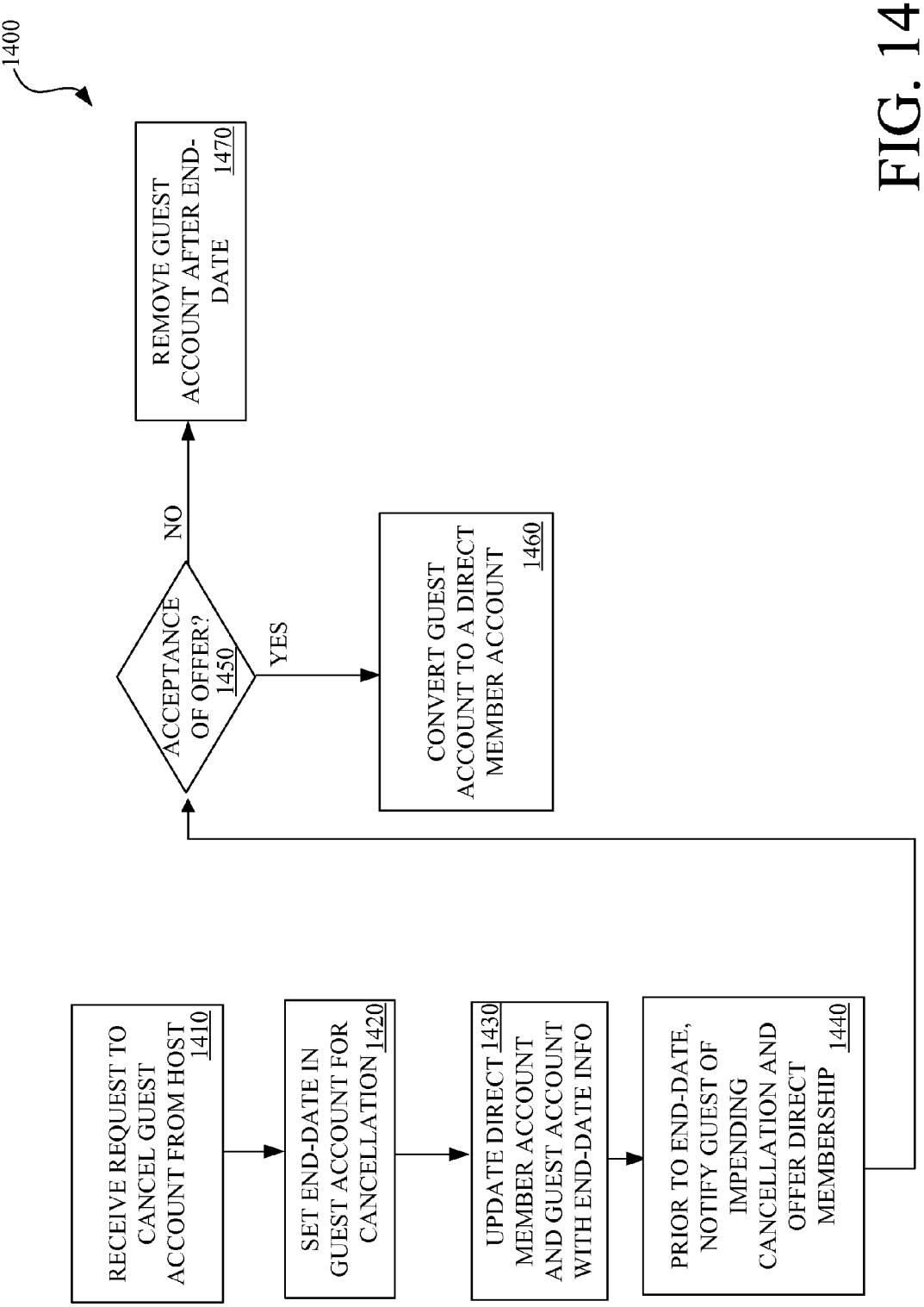
FIG. 14 is a flowchart describing one embodiment of a method for canceling a guest account by a host in the system of FIG. 1.

FIG. 13 is a diagram showing one embodiment of a user interface for managing a guest account. As shown in FIG. 13, the user interface 1300 displays the current applications and features 1310 of the guest account. Also, the current host 1320 sponsoring the guest account and its relevant features and/or applications are also identified. Next, to each application is a selection button 1330 that may be selected. Upon selecting a selection button and subsequently selecting the edit button 1340, the settings associated with the applications may be modified. For example, the end-date that terminates the availability of the guest account may be set to an earlier date by the guest or may be set to a date if the end-date had not been previously specified (i.e, an open end-date). A convert button 1350 is also provided, in some embodiments, to enable the user of the guest account to convert his or her guest account to a direct member account so that the user can enjoy the benefits of direct membership. In this way, a user can change his or her service settings.

FIGS. 14-17 describe additional functional capabilities of representative embodiments of the system 100 for facilitating a network community or method 200. Accordingly, FIG. 14 describes a method for the cancellation of a guest account by a host. In the first step, a request is received (1410) by the host to cancel a current guest account sponsored by the host. The request would be typically generated by a web-interface, although other embodiments may employ email communications or telephone communications that may have a lesser risk of fraudulent misuse. Alternatively, the act of removing a guest or pending guest from a host's roster list generates the request to cancel the guest account of the respective contact in some embodiments. After the request for cancellation is received, an end-date is set (1420) for the guest account. Accordingly, the cancellation of the guest account is set to occur at the time of the end-date or soon after. The setting of the end-date (in the guest account) may be an automated task that is performed upon receipt and verification of the authenticity of the cancellation request or the task may be performed by an operator who receives the cancellation request. When the end-date is set, the direct member account and the guest account are also updated (1430) with the new end-date of the guest account so that this information is available to the host and the guest respectively. Before occurrence of the end-date, the guest is notified (1440) about the impending cancellation of his or her guest account (by an email message, for example) and is offered (1440) an opportunity to become a direct member of the network service environment 130 to retain access to the services and/or applications that the user has been using under the host's sponsorship.

If the user accepts (1450-1460) this opportunity to become a direct member, then the user's guest account is converted to a direct member account and the user avoids having to undergo a new registration process. For example, the class of service marker 1102f in the guest account is changed indicate that the guest account has been converted to a direct member account. Further, pertinent format changes are implemented to make the organization structure of the guest account correspond to the organizational structure a direct member account. Alternatively, if the user denies (1450&1470) the opportunity to become a direct member, the user's guest account is cancelled at the end-date (or soon after), and the non-resident user is denied access to the application or services that the non-resident user received from the host's sponsorship of the guest.

Figure 15:
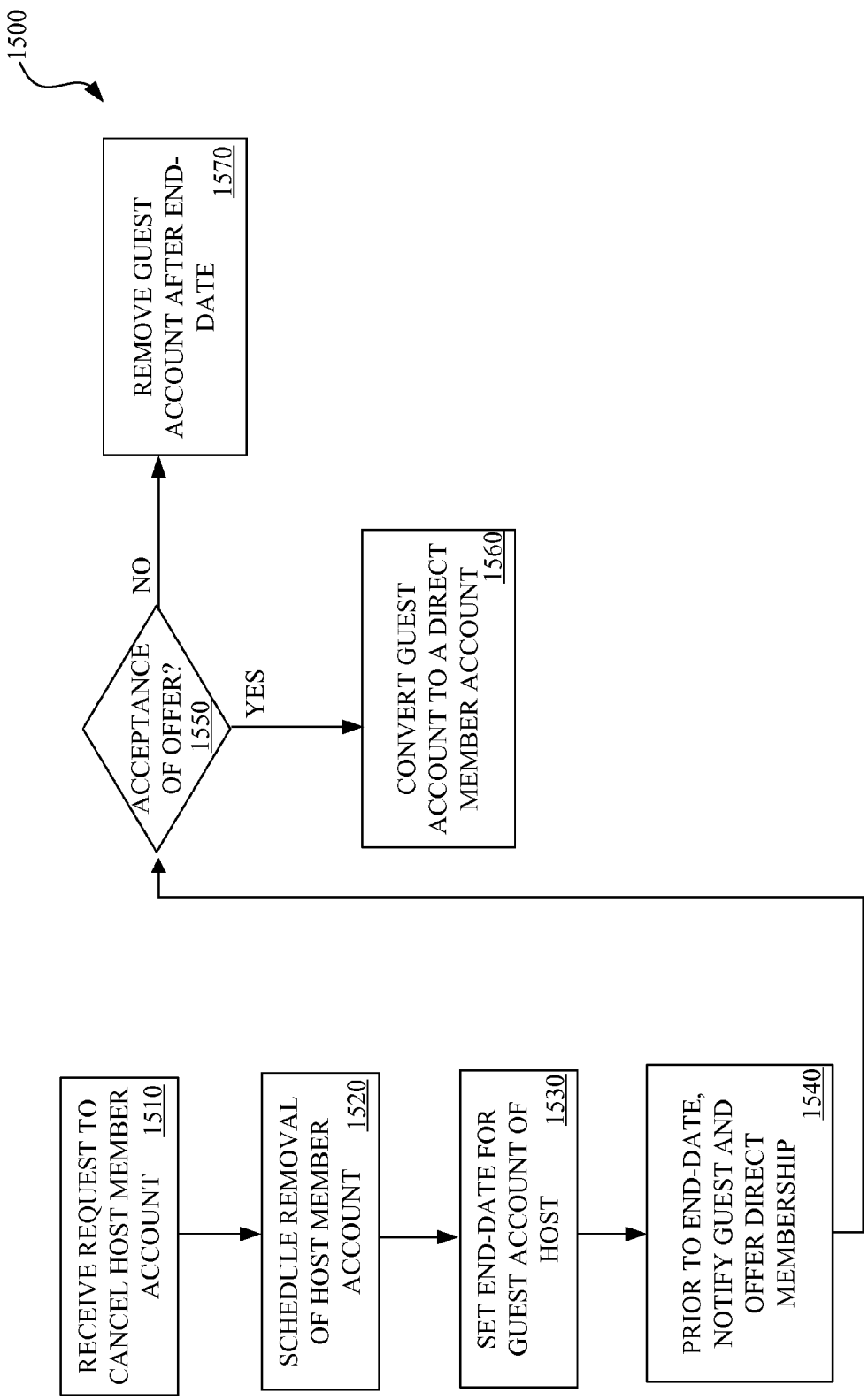
FIG. 15 is a flowchart describing one embodiment of a method for canceling a guest account due to cancellation of a host account in the system of FIG. 1.

FIG. 15 also describes a method for the cancellation of a guest account that is caused by the cancellation of the host account sponsoring the guest account. In the first step of this process, a request is received (1510) by the host to cancel the host account 1101. The request would be typically generated by a web-interface, although other embodiments may employ email communications or telephone communications that may have a lesser risk of fraudulent misuse. After the request for cancellation is received, the host account 1101 is scheduled for removal from the account database 115, 1106 storing the host account 1101. The host account 1101 can be scheduled to be removed immediately from the account database 115, 1106 or scheduled for removal in a short manner of time after the cancellation request has been received by the account server 110 (e.g., IM server 310). Next, a guest account 1102 sponsored by the host account 1101 is scheduled for removal by setting an end-date (1530) for termination of the guest account by the account server 110. For example, each guest account of each current guest or pending guest in a host's guest list 1101h is scheduled for deletion from the account database 115, 1106. Accordingly, the cancellation of the guest account 1102 is set to occur at the time of the end-date or soon after. The setting of the end-date (in the guest account 1102) may be an automated task that is performed upon receipt and verification of the authenticity of the cancellation request by the account server 110 or the task may be performed by an operator who receives the cancellation request. Before occurrence of the end-date, however, the guest is notified (1540) about the impending cancellation of his or her guest account 1102 (by an automated email message, a telephone call, etc.) and is offered (1540) an opportunity to become a direct member of the network service environment 130 to retain access to the services and/or applications that the user has been using under the host's sponsorship of the guest account.

If the user accepts (1550-1560) this opportunity to become a direct member, then the user's guest account 1102 is converted to a direct member account and the user avoids having to undergo a new registration process. For example, the class of service marker 1102f in the guest account can be updated to indicate that the guest account has been converted to a direct member account. Also, pertinent organizational changes can be implemented to convert the guest account into a direct member account. Alternatively, if the user denies (1550&1570) the opportunity to become a direct member, the user's guest account 1102 is cancelled at the end-date (or soon after), and the user is denied access to the application or services that the user received from the host's sponsorship of the user's guest account. For example, upon detection of an expired account (via a routine maintenance program), the account server 110 (e.g, IM server 310) removes or schedules removal of the expired member account.

Figure 16:
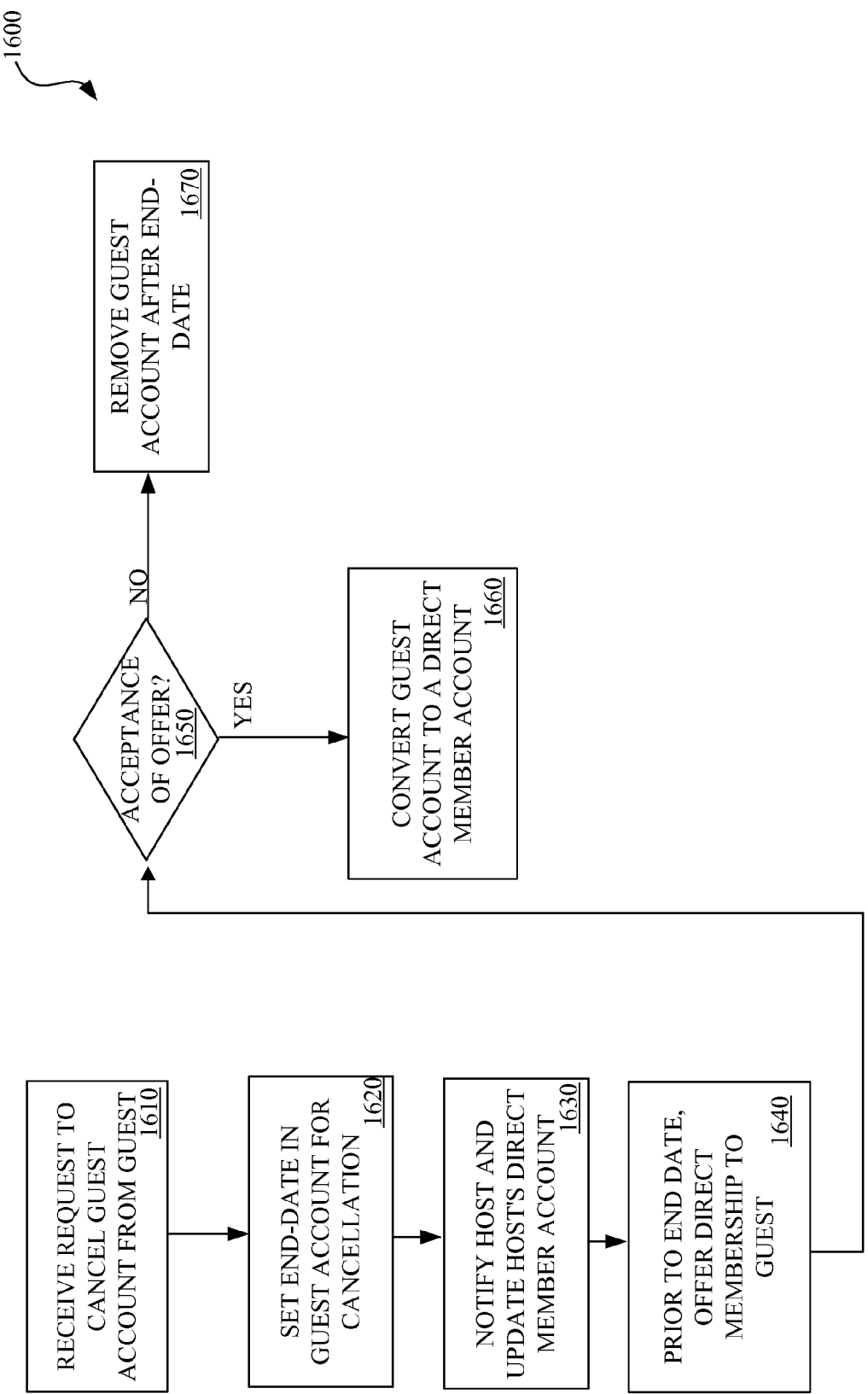
FIG. 16 is a flowchart describing one embodiment of a method for canceling a guest account by a guest in the system of FIG. 1.

Next, FIG. 16 describes a method for the cancellation of a guest account by a guest. For example, after a business relationship has ended, a guest of a business partner may choose to discontinue use of a service or product that was sponsored by the business partner. Therefore, in the first step of this type of process, a request is received (1610) from the guest to cancel the guest account 1102. The request would be typically generated by a web-interface, although other embodiments may employ email communications or telephone communications that may have a lesser risk of fraudulent misuse. Further, in some embodiments, the act of removing a host from the roster list of a guest generates the request for cancellation of the guest account.

The guest account 1102 is then scheduled for cancellation by setting an end-date (1620) for termination of the guest account 1102 from the account database 115, 315 storing the guest account 1102. Accordingly, the cancellation of the guest account 1102 is set to occur at the time of the end-date or soon after. The setting of the end account (in the guest account 1102) may be an automated task that is performed (by the account server 110, 310) upon receipt and verification of the authenticity of the cancellation request or the task may be performed by an operator who receives the cancellation request. Before occurrence of the end-date, however, the host is notified (1630) about the impending cancellation of a guest account 1102 sponsored by the host (by an email message, telephone call, etc.). Also, the host account is updated with the scheduled end-date for the guest account.

Prior to the occurrence of the end-date, the guest is offered (1640) an opportunity to become a direct member of the network service environment 130 to retain access to the services and/or applications that the user has been using under the host's sponsorship. This offer of direct membership may be made via an operator or an automatic response to receipt of the cancellation of the guest account 1102 (via a web page or an email message, for example) by the account server 110, 310. If the user accepts (1650-1660) this opportunity to become a direct member, then the non-resident user's guest account 1102 is converted to a direct member account (by the account server 110, 310) and the user avoids having to undergo a new registration process. Alternatively, if the user denies (1650&1670) the opportunity to become a direct member, the user's guest account 1102 is cancelled at the end-date (or soon after) by the account server 110, 310, and the non-resident user is denied access to the application or services that the user received from the host's sponsorship of the guest account 1102.

Figure 17:
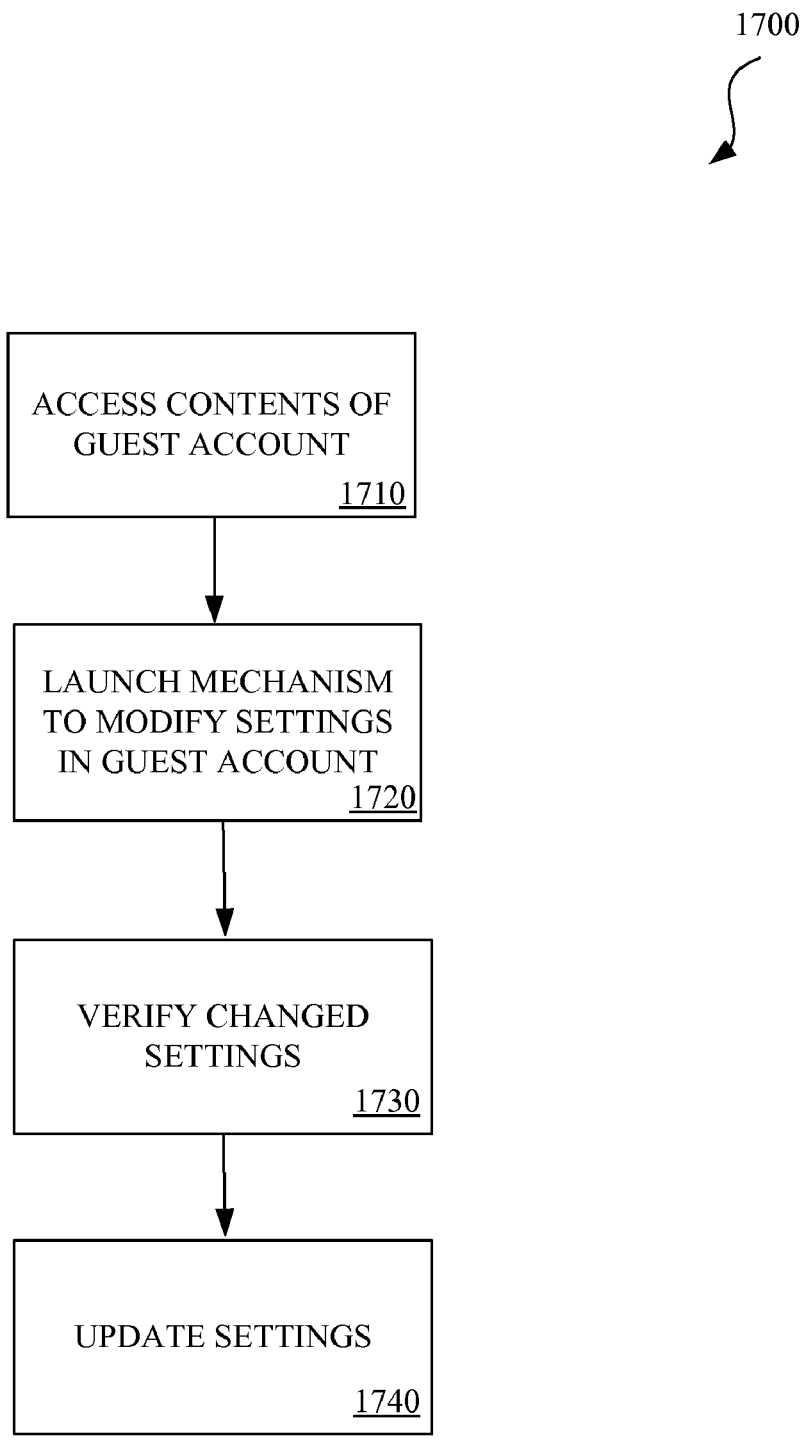
FIG. 17 is a flowchart describing one embodiment of a method for modifying settings in a guest account in the system of FIG. 3.

FIG. 17 describes a representative embodiment of a method 1700 for a guest to manage and modify guest account settings. First, a user accesses (1710) the contents of his or her guest account via an application client 125 for the product or service associated with the guest account 1102. The application client 125 can be a general client device (such as a web browser) that may be used for other services and/or products or a specific client device (e.g., IM client 325) that is used exclusively for the product/service. Also note, in some embodiments, a user can have more than one guest account for more than application or service.

Via the respective application client 125, the user launches or activates (1720) a mechanism to modify settings in the selected guest account. In the user interface of FIG. 12, for example, the user clicks on the guest settings selection button 1235 to launch such a mechanism. Via this mechanism, the user selects (1720) a particular guest setting to modify or set. For example, in some embodiments, the user can choose to modify (1720) his or her end-date of the guest sponsorship. In this way, the user can change an open end-date to a specified end-date or may change a specified end-date to an earlier end-date. Likewise, the host may also move the end-date to an earlier date than was specified by the guest. After the guest setting has been modified, the user verifies (1730) the desired change and the guest account is updated (1740) to include the desired change.

Note, the guest invitation can comprise different messaging formats. For example, in one embodiment, the guest invitation is an instant messaging format. Accordingly, a direct member can specify an instant messaging address of a non-direct member (in a similar manner as an email address is specified as previously discussed) and inject a guest invitation directly into an instant messaging chat session that the direct member is having with the non-direct member, for example. Therefore, the guest invitation is not limited to an email format, as discussed in the above examples.

The above-described embodiments enable associations and communities of users to be built and a system for locating these associations/communities. Consider that users are likely to maintain membership in a provider's network service environment if the user has established relations with other users of the network service environment and/or the provider itself. Therefore, this type of management structure also has a variety of uses. For example, a sales agent having a member account to the network service environment 130 can set up a guest account for a potential customer to try out a product or service during a trial period. Since the guest account includes information about the sales agent, the sales agent is linked to the guest account and assured of receiving credit for a potential sale. Also, in a business environment, business agents can set up guest accounts for business partners for particular projects. The provider of such a system enables direct customers (to the provider) to have a higher level of value because the direct customers can also have users that the direct customers are also attempting to serve. This is but one of many examples. There are also many reasons why a host would want someone to be his or her guest: For example, adding a guest may make the host's services more attractive (e.g., have someone to interact with for communication-type product and services). Also, a host may need to establish a temporary relationship with guest or may want to foster a new or pre-existing relationship with someone.

The account server 110, application server 140, and application clients 125, 135 of embodiments can be implemented in hardware, software, firmware, or a combination thereof. In the preferred embodiments, the account server 110, application server 140, and application clients 125, 135 are implemented in software or firmware that is stored in a memory and that is executed by a suitable instruction execution system. If implemented in hardware, as in an alternative embodiment, account server 110, application server 140, and application clients 125, 135 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc Accordingly, in some embodiments, account server 110, application server 140, and application clients 125, 135, as computer programs, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments in logic embodied in hardware or software-configured mediums.

Note, any process descriptions or blocks in flow charts should be understood as representing modules, segments, or portions of code which include one or more executable instructions for implementing specific logical functions or steps in the process, and alternate implementations are included within the scope of the preferred embodiment in which functions may be executed out of order from that shown or discussed, including substantially concurrently or in reverse order, depending on the functionality involved, as would be understood by those reasonably skilled in the art of the present disclosure.

It should be emphasized that the above-described embodiments, particularly, any "preferred" embodiments, are merely possible examples of implementations, merely set forth for a clear understanding of the principles of the disclosure. Many variations and modifications may be made to the above-described embodiments without departing substantially from the principles of the disclosure. For example, in some embodiments, the functionality of the account server and application server is consolidated into a single server. Further, in some embodiments, the host sponsoring the guest account subsidizes most of the cost involved in providing the guest account. However, the guest may also contribute a small portion of the cost via a small fee. As a safety measure, in some embodiments, a host may even be prevented or limited from having guest accounts (or a certain number of guest accounts) if the host has abused rules of a network service environment directed to a policy for granting guest accounts, if the guests of a host has abused an acceptable use policy of the network service environment, etc., for example. All such modifications and variations are intended to be included herein within the scope of this disclosure.

Therefore, having thus described the invention, at least the following is claimed:

1. A system for managing accounts within a network community, comprising:
    an account server configured to:
        manage a plurality of direct accounts for a plurality of resident users of the network community and a guest account for a guest user of a respective resident user;
        send to the guest user of the network community an invitation to become a direct member of the network community; and
        create a direct member account for the guest user after the sending of the invitation.

2. The system of claim 1, further comprising:
    a client of the guest user of the respective resident user configured to send a response to the invitation to become a direct member of the network community.

3. The system of claim 1, the account server further configured to:
    send the invitation to the guest user prior to cancellation of the guest user account.

4. The system of claim 1, further configured to:
    notify a host of an acceptance or declination of the invitation to become a direct member of the network community by the guest user.

5. The system of claim 1, the account server further configured to:
    receive a response from the guest user to the invitation to become a direct member of the network community; and
    activate the direct member account of the guest user if the response to the invitation is acceptance of the invitation, wherein guest information stored within the guest account is used to setup the direct member account.

6. The system of claim 1, wherein the invitation is an email message.

7. The system of claim 1, wherein a respective guest account contains a data field to specify an end-date for canceling the respective guest account, the account server configured to:
    after occurrences of the end-data, offer the guest user associated with the respective guest account an opportunity to convert the respective guest account into a new direct account;
    schedule a cancellation date of the guest account after receiving a request to cancel a respective direct account of the respective resident user sponsoring the guest account;
    schedule a cancellation date of the guest account after receiving a request, from the respective resident user sponsoring the guest account, to cancel the guest account of the guest user; and
    schedule a cancellation date of the guest account after receiving a request, from the guest user associated with the guest account, to cancel the guest account.

8. The system of claim 7, wherein the request to cancel the guest account is generated by an act of removing the guest user associated with the guest account from a roster list of the respective resident user.

9. The system of claim 7, wherein the request to cancel the guest account is generated by an act of removing the respective resident user from a roster list of the guest user.

10. The system of claim 1, wherein members of the network community utilize a common network service, the members of the network community comprising the plurality of resident users and guest users of the plurality of resident users.

11. The system of claim 10, wherein the network service is an Internet application.

12. A system for managing accounts within a network community, comprising:
    means for sending an invitation to a guest user to become a direct member of the network community;
    means for managing a guest account of the guest user of the network community;
    means for creating a new direct member account for the guest user after sending an invitation to the guest user; and means for setting up the new direct member account with information contained within the guest user account.

13. The system of claim 12, further comprising:

means for answering the invitation;

means for activating the new direct member account if an answer to the invitation is an acceptance of the invitation; and means for deleting the guest account if the answer to the invitation is a declination of the invitation.

14. The system of claim 12, further comprising:

means for specifying an end-date for canceling the guest account; and means for, after occurrence of the end-date, offering the guest user an opportunity to convert the guest account into the new direct member account.

15. A method for managing accounts within a network community, comprising:

managing a guest account of a guest user of the network community;

sending an invitation to the guest user to become a direct user of the network community; and creating a new direct member account for the guest user after sending the invitation to the guest user.

16. The method of claim 15, wherein identification information about the guest user contained in the guest account is utilized to setup the new direct member account.

17. The method of claim 15, further comprising:

specifying and end-date for canceling the guest account, wherein the end-date is stored in a data field contained in the guest account; and after occurrences of the end-data, offering the guest user an opportunity to convert the guest account into the new direct account.

18. The method of claim 15, further comprising:

after receiving an acceptance to the invitation by the guest user, activating the new direct member account.

19. The method of claim 15, further comprising:

receiving an answer to the invitation;

deleting the guest account if the answer to the invitation is a declination of the invitation; and activating the new direct member account if the answer to the invitation is an acceptance of the invitation.

20. The method of claim 15, wherein members of the network community utilize a common network service, the members of the network community comprising resident users and guests of the resident users.

* * * * *